United States Patent
Moren

(10) Patent No.: US 6,734,268 B2
(45) Date of Patent: May 11, 2004

(54) METAL SALT MODIFIERS FOR BONDING COMPOSITIONS

(75) Inventor: Dean M. Moren, North Saint Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 123 days.

(21) Appl. No.: 10/037,058

(22) Filed: Dec. 31, 2001

(65) Prior Publication Data

US 2003/0195318 A1 Oct. 16, 2003

(51) Int. Cl.$^7$ .................................................. C08F 4/52
(52) U.S. Cl. ...................... 526/196; 526/134; 526/183; 526/195; 526/197; 526/198; 526/328; 526/329.1; 526/217; 526/346; 428/500; 156/325; 156/326
(58) Field of Search .......................... 428/500; 526/196, 526/328, 329.1, 197, 198, 346, 217, 183, 195, 134; 156/325, 326

(56) References Cited

U.S. PATENT DOCUMENTS

| | | | |
|---|---|---|---|
| 4,538,920 A | | 9/1985 | Drake |
| 5,082,147 A | | 1/1992 | Jacobs |
| 5,106,928 A | * | 4/1992 | Skoultchi et al. ........... 526/196 |
| 5,286,821 A | * | 2/1994 | Skoultchi .................... 526/196 |
| 5,539,070 A | | 7/1996 | Zharov et al. |
| 5,616,796 A | | 4/1997 | Pocius et al. |
| 5,677,405 A | | 10/1997 | Goodall et al. |
| 5,684,102 A | | 11/1997 | Pocius et al. |
| 5,690,780 A | | 11/1997 | Zharov et al. |
| 5,691,065 A | | 11/1997 | Zharov et al. |
| 5,795,657 A | | 8/1998 | Pocius et al. |
| 5,859,160 A | | 1/1999 | Righettini et al. |
| 5,935,711 A | | 8/1999 | Pocius et al. |
| 6,252,023 B1 | * | 6/2001 | Moren ........................ 526/196 |
| 6,291,593 B1 | | 9/2001 | Cheng |
| 6,383,655 B1 | * | 5/2002 | Moren ........................ 428/522 |
| 6,384,165 B1 | * | 5/2002 | Moren ........................ 526/196 |
| 6,479,602 B1 | * | 11/2002 | Moren ........................ 526/196 |
| 6,486,090 B1 | * | 11/2002 | Moren ........................ 502/171 |

FOREIGN PATENT DOCUMENTS

| | | |
|---|---|---|
| EP | 0 561 352 A1 | 9/1993 |
| EP | 684034 B1 | 11/1995 |
| JP | 99 171 915 | 6/1999 |
| WO | WO 97/17383 | 5/1997 |
| WO | WO 01/32716 | 5/2001 |
| WO | WO 01/32717 | 5/2001 |
| WO | WO 01/68783 | 9/2001 |

OTHER PUBLICATIONS

Greenwood, N. N. and Earnshaw A., "Chemical Periodicity and the Periodic Table", Chemistry of the Elements, 1984, pp. 24–37.

Minford, Dean J., "The Use of Adhesives in the Joining of Plastics", Treatise on Adhesion and Adhesives, 1991, pp. 333–435.

Hartshorn, S.R., "Structural Adhesives Chemistry and Technology", 1986, pp. 231–233.

Odian, George, "Principles of Polymerization", Second Edition, 1981, pp. 587–610.

U.S. Ser. No. 10/037,074, filed Dec. 31, 2001, "Initiator Systems Comprising β–Ketone Compounds and Bonding Compositions Made Therewith", pp. 1–61.

Brewis, D.M., "Adhesion Problems At Polymer Surfaces", *Progress In Rubber Plastic Technology*, Vol. 1, pp. 1–21, 1985.

* cited by examiner

Primary Examiner—Tatyana Zalukaeva
(74) Attorney, Agent, or Firm—Scott A. Bardell

(57) ABSTRACT

The invention provides bonding compositions and reactive two-part bonding compositions that are useful, for example, in bonding low surface energy substrates (e.g., polyethylene, polypropylene and polytetrafluoroethylene). Bonding compositions of the invention include an organoborane, a polymerizable monomer, and a metal salt which modifies the cure kinetics of the bonding composition to provide a favorable balance of long bonding composition worklife and fast rate of strength build.

51 Claims, No Drawings

METAL SALT MODIFIERS FOR BONDING COMPOSITIONS

FIELD

The invention relates to bonding compositions, particularly bonding compositions for low surface energy substrates and reactive two-part bonding compositions. The bonding compositions are particularly useful to prepare bonded composites, particularly of low surface energy substrates.

BACKGROUND

An efficient, effective means for adhesively bonding low surface energy substrates such as polyethylene, polypropylene and polytetrafluoroethylene (e.g., TEFLON) has long been sought. The difficulties in adhesively bonding these materials are well known. See, for example, "Adhesion Problems at Polymer Surfaces" by D. M. Brewis that appeared in Progress in Rubber and Plastic Technology, volume 1, page 1 (1985).

The conventional approaches often use complex and costly substrate surface preparation techniques such as flame treatment, corona discharge, plasma treatment, oxidation by ozone or oxidizing acids and sputter etching. Alternatively, the substrate surface may be primed by coating it with a high surface energy material. However, to achieve adequate adhesion of the primer, it may be necessary to first use the surface preparation techniques described above. All of these techniques are well known, as reported in Treatis on Adhesion and Adhesives (J. D. Minford, editor, Marcel Dekker, 1991, New York, volume 7, pages 333–435). The known approaches are frequently customized for use with specific substrates. As a result, they may not be useful for bonding low surface energy substrates generally.

Moreover, the complexity and cost of the presently known approaches do not render them particularly suitable for use by the retail consumer (e.g., home repairs, do-it-yourselfers, etc.) or in low volume operations. One persistent problem is the repair of many inexpensive common household articles that are made of polyethylene, polypropylene or polystyrene such as trash baskets, laundry baskets and toys.

A series of patents issued to Zharov et al. (U.S. Pat. Nos. 5,539,070, 5,690,780 and 5,691,065) report a polymerizable acrylic bonding composition that comprises at least one acrylic monomer, an effective amount of certain organoborane amine complexes, and an effective amount of an acid for initiating polymerization of the acrylic monomer. The acrylic composition is especially useful as an acrylic adhesive for bonding low surface energy polymers.

Another series of patents issued to Pocius et al. (U.S. Pat. Nos. 5,616,796, 5,684,102 and 5,795,657) report polymerizable acrylic bonding compositions that comprise acrylic monomer, organoborane polyamine complex and a material reactive with amine. Polymerizable acrylic monomer compositions useful as adhesives for bonding low surface energy polymers can be prepared. The polyamine is the reaction product of a diprimary amine-terminated material, and a material having at least two groups reactive with a primary amine.

With increasingly demanding end-user requirements, bonding composition formulators are constantly being challenged to improve both application performance (e.g., worklife, rate of strength increase and cure time) and physical property performance (e.g., T-peel strength) of bonding compositions. It is very often times the case that a formulation change that enhances one property of a bonding composition deleteriously affects a second property of the bonding composition. Because of this, the formulator may have to accept less than a desirable balance between the competing properties. For this reason, adhesive formulators are constantly seeking new materials that provide a more favorable overall balance of properties in bonding compositions.

In many industrial and consumer applications for bonding compositions a long worklife is very desirable feature. Worklife refers generally to the maximum time period available for bringing the bonding composition into contact with the substrate(s) to be bonded (i.e., closing the bond) after the initiation of the cure of the bonding composition. If the substrates are brought into contact with the bonding composition after the worklife has expired, the ultimate strength of the bond formed between the substrates is compromised.

Several techniques have been reported for increasing the worklife of bonding compositions. In one known technique, worklife is increased by slowing the cure rate of the bonding composition, for example, by reducing the amount of polymerization initiator in the bonding composition and/or the chemical reactivity of the initiator. This technique, however, may typically lengthen the overall cure time and may slow the rate of strength increase of the bonding composition. The addition of certain polymerizable monomers to bonding compositions has also been reported to increase worklife. U.S. Pat. No. 5,859,160 (Righettini et al.) reports a free radical curable composition, useful as a two part adhesive, that includes a free radical curable compound and a vinyl aromatic compound that is chemically different than the free radical curable compound. Another known technique for increasing worklife is disclosed in U.S. Pat. No. 6,291,593 (Cheng) by the addition of a retarding additive selected from the group consisting of non-protic Lewis acids, zinc salts and mixtures thereof. Worklife extension was not demonstrated for these retarding additives for organoborane based systems.

Although the above reported techniques may be used to increase the worklife of bonding compositions, other properties of the bonding composition such as rate of strength build, cure time and T-peel strength may be sacrificed as a result of the increased worklife. In view of the foregoing, improved compositions having a favorable balance of long bonding composition worklife and fast rate of strength build are desirable.

SUMMARY

The present invention provides bonding compositions that are particularly useful in bonding low surface energy substrates (e.g., polyethylene, polypropylene and polytetrafluoroethylene) to one another. Bonding compositions of the present invention include an organoborane, a polymerizable monomer, and a metal salt which functions to modify the cure kinetics of the bonding composition to provide a favorable balance of long bonding composition worklife and fast rate of strength build.

In one embodiment the present invention provides a bonding composition comprising:

(i) an organoborane;

(ii) a polymerizable monomer; and (iii) a metal salt according to formula (1):

$$[M^{a+}L_n][X^{-m}]_{a/m} \qquad (1)$$

wherein:

M is a metal cation having two chemically accessible oxidation states and having positive charge a, where a is an integer ranging from 1 to 6;

X is a counterion having charge -m, where m is an integer ranging from 1 to 3;

L is a covalently bonded ligand; and n is an integer ranging from 0 to 10 representing the number of ligands covalently bonded to the metal cation.

Representative examples of metal cation M having two chemically accessible oxidation states include vanadium, chromium, manganese, iron, cobalt, nickel, copper, molybdenum, ruthenium, rhodium, palladium, antimony, platinum, and cerium. In a preferred embodiment of the invention, the two chemically accessible oxidation states of are separated by one unit of charge.

Representative examples of counterion X include halides, borates, sulfonates, and carboxylates, more preferably chloride, bromide, tetrafluoroborate, trifluoromethanesulfonate, naphthenate, and 2-ethylhexanoate.

Representative examples of ligand L include ammonia, amine, carbonyl, isonitriles, phosphines, phosphites, arsines, nitrosyl, ethylene and alkenes.

Examples of metal salts suitable for use in the present invention include copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, and palladium (II) bromide.

Typically, the metal salt is present in an amount greater than 0 ppm and less than about 40,000 ppm (based on the bonding composition), more preferably in an amount ranging from about 60 ppm to about 20,000 ppm (based on the bonding composition) and most preferably in an amount ranging from about 100 ppm to about 2,000 ppm (based on the bonding composition).

In a preferred embodiment of the invention, the organoborane is complexed with a complexing agent and the bonding composition further includes a decomplexer. Preferred complexing agents include, for example, amines, amidines, hydroxides, alkoxides, and combinations thereof. Preferred decomplexers include, for example, acid, anhydride, aldehyde, β-ketone compound, isocyanate, acid chloride, sulfonyl chloride, and combinations thereof.

Bonding compositions of the present invention may have a worklife as defined in the Worklife Test Method of about 5 minutes or greater, more preferably about 10 minutes or greater, and most preferably about 20 minutes or greater.

In another embodiment, the present invention provides a bonded composite comprising:
 a first substrates, and a second substrate adhesively bonded together by a layer of a cured bonding composition.

In a preferred embodiment at least one of the first and second substrates is a low surface energy polymeric material, for example, polyethylene, polypropylene and polytetrafluoroethylene.

In another embodiment, the present invention provides a reactive, two-part bonding composition comprising:
 (a) an initiator component comprising an organoborane; and
 (b) a polymerizable composition comprising:
   at least one polymerizable monomer and
   a metal salt according to formula (1), as described above.

The first part and the second part are typically combined in a whole number ratio of about 1:10 to about 1:1.

In a preferred embodiment of the invention, the organoborane is complexed with a complexing agent and the second part further comprises a decomplexer.

As used herein the term "organic groups" can be aliphatic groups or cyclic groups. In the context of the present invention, the term "aliphatic group" means a saturated or unsaturated, linear or branched, hydrocarbon group. This term is used to encompass alkylene, alkenylene, alkynylene, alkyl, alkenyl, and alkynyl groups, for example. The term "alkyl group" means a monovalent, saturated, linear or branched, hydrocarbon group (e.g., a methyl, ethyl, isopropyl, t-butyl, heptyl, dodecyl, octadecyl, amyl, or 2-ethylhexyl group, and the like). The term "alkylene" means a multivalent, saturated, linear or branched hydrocarbon group. The term "alkenyl group" means a monovalent, unsaturated, linear or branched, hydrocarbon group with one or more carbon-carbon double bonds (e.g., a vinyl group). The term "alkenylene" means a multivalent, unsaturated, linear or branched, hydrocarbon group with one or more carbon-carbon double bonds. The term "alkynyl group" means a monovalent, unsaturated, linear or branched, hydrocarbon group with one or more carbon-carbon triple bonds. The term "alkynylene" means a multivalent, linear or branched, hydrocarbon group with one or more carbon-carbon triple bonds.

The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mononuclear aromatic hydrocarbon group or polynuclear aromatic hydrocarbon group.

Organic groups or organic linking groups, as used herein, can include heteroatoms (e.g., O, N, or S atoms), such as in the case of heterocyclic groups, as well as functional groups (e.g., carbonyl groups).

DETAILED DESCRIPTION OF THE PREFERRED EMBODIMENTS

The present invention provides bonding compositions that are particularly useful in bonding low surface energy substrates (e.g., polyethylene, polypropylene and polytetrafluoroethylene) to one another. Bonding compositions of the present invention include an organoborane, a polymerizable monomer, and a metal salt which functions to modify the cure kinetics of the bonding composition to provide a desirable balance of long adhesive worklife and fast rate of strength build. Bonding compositions of the present invention may be provided in the form of a two-part bonding composition comprising: an initiator component comprising an organoborane; a polymerizable composition comprising at least one polymerizable monomer; and a metal salt.

The individual components of the bonding compositions of the present invention are described below in detail below.

Organoborane:

The organoborane initiates free-radical polymerization of the polymerizable monomer to form a polymer that can be useful as an bonding composition, for example an acrylic adhesive. The organoborane initiator may be represented by the following general formula:

where $R^1$ is an alkyl group having 1 to about 10 carbon atoms. $R^2$ and $R^3$ may be the same or different and are independently selected from alkyl groups having 1 to about 10 carbon atoms and aryl groups. Preferably, $R^1$, $R^2$ and $R^3$ are independently selected from alkyl groups having 1 to about 5 carbon atoms. Accordingly, $R^1$, $R^2$ and $R^3$ may all be different, or more than one of $R^1$, $R^2$ and $R^3$ may be the same. Together, $R^1$, $R^2$ and $R^3$, along with the boron atom (B) to which they are attached, form the initiator. Specific organoborane initiators include, for example, trimethylborane, triethylborane, tri-n-propylborane, triisopropylborane, tri-n-butylborane, triisobutylborane, and tri-sec-butylborane.

Preferably, organoborane initiators are complexed with a complexing agent and may be represented by the following general formula:

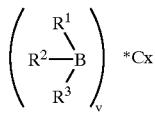

wherein $R^1$, $R^2$ and $R^3$ are as described above and wherein Cx is a complexing agent.

Complexing Agents:

Useful complexing agents (Cx) include, for example, amines, amidines, hydroxides and/or alkoxides. The ratio of boron atoms to complexing agent (Cx) in the complex is represented by "v" and is preferably selected so as to provide an effective ratio of the complexing agent and boron atoms. The boron atom to complexing agent ratio in the complex is preferably about 1:1. The boron atom to complexing agent ratio of greater than 1:1 could leave free organoborane, a material that tends to be pyrophoric.

Amine Complexing Agents:

Amine complexing agents (Cx) may be provided by a wide variety of materials having at least one amine group, including blends of different amines. Amine complexing agents may also be polyamines (i.e., materials having two or more amine groups such as two to four amine groups).

In one embodiment the amine complexing agent may be a primary or secondary monoamine, such as those represented by the structure:

wherein $R^4$ and $R^5$ are independently selected from the group consisting of hydrogen, and organic groups, preferably alkyl groups having 1 to 10 carbon atoms, alkylaryl groups in which the amine group is not directly attached to the aryl structure, and polyoxyalkylene groups. Alternatively, $R^4$ and $R^5$ together with the nitrogen atom to which they are attached may be joined to form a 4 to 7 membered heterocyclic ring. Particular examples of these amines include ammonia, ethylamine, butylamine, hexylamine, octylamine, benzylamine, morpholine, piperidine, pyrrolidine, and polyoxyalkylene monoamines (e.g., JEFFAMINES from Huntsman Chemical Company, such as M715 and M2005).

In another embodiment, the amine may be a polyamine such as those described by the structure:

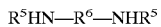

wherein $R^5$ is as defined above and wherein $R^6$ is an organic group, preferably a divalent alkylene, arylene or alkylarylene group. Preferred among these materials are alkane diamines which may be branched or linear, and having the general structure

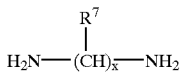

in which x is a whole number greater than or equal to 1, more preferably about 2 to 12, and each $R^7$ is independently a hydrogen or an alkyl group. Particularly preferred examples of alkane diamines include 1,2-ethanediamine, 1,3-propanediamine, 1,5-pentanediamine, 1,6-hexanediamine, 1,12-dodecanediamine, 2-methyl-1,5-pentanediamine, 3-methyl-1,5-pentanediamine, and isomers of these materials. While alkane diamines are preferred, other alkyl polyamines may be used such as triethylene tetraamine and diethylene triamine.

Useful polyamines may also be provided by a polyoxyalkylenepolyamine. Polyoxyalkylenepolyamines suitable in making complexes for the invention may be selected from the following structures:

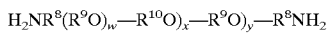

(i.e., polyoxyalkylene diamines); or

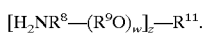

$R^8$, $R^9$ and $R^{10}$ are alkylene groups having 1 to 10 carbon atoms and may be the same or may be different. Preferably, R8 is an alkylene group having 2 to 4 carbon atoms such as ethylene, n-propylene, iso-propylene, n-butylene or iso-butylene. Preferably, $R^9$ and $R^{10}$ are alkylene groups having 2 or 3 carbon atoms such as ethylene, n-propylene or iso-propylene. $R^{11}$ is the residue of a polyol used to prepare the polyoxyalkylenepolyamine (i.e., the organic structure that remains if the hydroxyl groups are removed). $R^{11}$ may be branched or linear, and substituted or unsubstituted (although substituents should not interfere with oxyalkylation reactions).

The value of w is $\geq 1$, more preferably about 1 to 150, and most preferably about 1 to 20. The value of x and y are both $\geq 0$. The value of z is >2, more preferably 3 or 4 (so as to provide, respectively, polyoxyalkylene triamines and tetraamines). It is preferred that the values of w, x, y and z be chosen such that the resulting complex is a liquid at room temperature ("room temperature" refers to, herein, a temperature of about 20 to 25° C.) as this simplifies handling and mixing thereof. Usually, the polyoxyalkylenepolyamine is itself a liquid. For the polyoxyalkylenepolyamine, molecular weights of less than about 5,000 may be used, although molecular weights of about 1,000 or less are more preferred, and molecular weights of about 140 to 1,000 are most preferred.

Examples of particularly preferred polyoxyalkylenepolyamines include polyethyleneoxidediaamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, and poly(ethyleneoxide-co-propyleneoxide)triamine.

Examples of suitable commercially available polyoxyalkylenepolyamines include various JEFFAMINES from Huntsman Chemical Company such as the D, ED, and EDR series diamines (e.g., D-400, D-2000, D-5000, ED-600, ED-900, ED-2001, and EDR-148), and the T series triamines (e.g., T-403), as well as DCA-221 from Dixie Chemical Company.

As reported in U.S. Pat. No. 5,616,796 (Pocius et al.), the polyamine may also comprise the condensation reaction product of diprimary amine-terminated material (i.e., the two terminal groups are primary amine) and one or more materials containing at least two groups reactive with primary amine.

Hydroxide/Alkoxide Complexing Agents:

Hydroxide and/or alkoxide complexing agents (Cx) are reported, for example, in PCT Publication WO 01/32716 (Moren). Preferred hydroxide and/or alkoxide complexing agents may be represented by the formula:

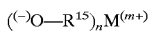

wherein:
R$^{15}$ is independently selected from hydrogen or an organic group (e.g., alkyl or alkylene group);
M$^{(m+)}$ represents a countercation (e.g., sodium, potassium, tetraalkylammonium, or combinations thereof);
n is an integer greater than zero; and
m is an integer greater than zero.

Amidine Complexing Agents:

Preferred amidine complexing agents (Cx) are reported in PCT Publication WO 01/32717 (Moren). Preferred amidine complexing agents may be represented by the formula:

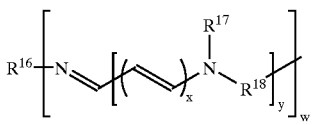

wherein:
R$^{16}$ is hydrogen or an organic group, preferably hydrogen or an alkyl or alkylene group;
R$^{17}$ and $^{R18}$ are independently a monovalent organic group or part of a cyclic structure; and
w, x, and y comprise integers, preferably w being 1 and x being about 3 or less.

Particularly preferred amidine complexing agents comprise those selected from the group consisting of N,N,N',N'-tetramethylguanidine; 1,8-diazabicyclo[5.4.0]undec-7-ene; 1,5-diazabicyclo[4.3.0]non-5-ene; 2-methylimidazole; 2-methylimidazoline; and 4-(N,N-dimethylamino)-pyridine.

An organoborane complex may be readily prepared using known techniques. Typically, the complexing agent is combined with the organoborane in an inert atmosphere (e.g., a glove box flushed with nitrogen to an environment having less than 100 ppm oxygen) with slow stirring. The organoborane can be added from a pressure equalizing dropping funnel to a flask into which the coupling agent has been previously weighed. An exotherm is often observed and cooling of the mixture is, therefore, recommended. Addition of the organoborane may be moderated to control the exotherm. If the ingredients have a high vapor pressure, it is desirable to keep the reaction temperature below about 70° to 80° C. Once the materials have been well mixed the complex is permitted to cool to room temperature. No special storage conditions are required although it is preferred that the complex be kept in a capped vessel in a cool, dark location. A crystalline mass of the complex can be heated (e.g., to about 55° C.) with an oil bath and outside of the nitrogen environment to liquify the complex and facilitate its transfer to the storage vial, which can be flushed with nitrogen.

The organoborane is employed in an effective amount, which is an amount large enough to permit acrylic monomer polymerization to readily occur to obtain an acrylic polymer of high enough molecular weight for the desired end use. If the amount of organoborane is too low, then the polymerization may be incomplete or, in the case of adhesives, the resulting composition may have poor adhesion. On the other hand, if the amount of organoborane is too high, then the polymerization may proceed too rapidly to allow for effective mixing and use of the resulting composition.

Large amounts of organoborane could potentially weaken the bond formed by a bonding composition of the present invention. The useful rate of polymerization will depend in part on the method of applying the composition to a substrate. Thus, a faster rate of polymerization may be accommodated by using a high speed automated industrial adhesive applicator rather than by applying the composition with a hand applicator or by manually mixing the composition.

Within these parameters, an effective amount of the organoborane is an amount that preferably provides about 0.003 to 1.5%-wt. boron, more preferably about 0.008 to 0.5%-wt. boron, most preferably about 0.01 to 0.3%-wt. boron. The %-wt. of boron in a composition is based on the total weight of the composition, less fillers, non-reactive diluents, and other non-reactive materials. Thus, the polymerizable monomers, the vinyl aromatic compound, and organic thickener, (e.g., poly(methyl methacrylate) or core-shell polymer), if present, are included, but ingredients lacking abstractable hydrogen atoms or unsaturation are not. The %-wt. of boron in the composition may be calculated by the following equation:

$$\frac{(\text{weight of organoborane in the composition}) \times (\%\text{-wt. of boron in the organoborane})}{(\text{Total weight of the composition less non-reactive components})}$$

Quite advantageously, the organoborane is carried by (e.g., dissolved in or diluted by) a diluent or a blend of two or more different diluents. The diluent should not be reactive toward the complexing agent and functions as an extender for the organoborane.

Metal Salt:

Bonding compositions of the present invention comprise at least one metal salt which functions to modify the cure kinetics of the bonding composition to provide a desirable balance of long adhesive worklife and fast rate of strength build. Suitable metal salts have the following general formula:

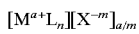

wherein:
M is a metal cation having two chemically accessible oxidation states and having positive charge a, where a is an integer ranging from 1 to 6;

X is a counterion having charge -m, where m is an integer ranging from 1 to 3;

L is a covalently bonded ligand; and n is an integer ranging from 0 to 10 representing the number of ligands covalently bonded to the metal cation.

Suitable metal cations (M) have at least two chemically accessible oxidation states. The term "chemically accessible oxidation states" is well known to one skilled in the art. Chemically accessible oxidation states of various elements can be found, for example, in "Chemistry of the Elements" by N. N. Greenwood and A. Earnshaw, Pergamon Press, 1984, at pages 24–37. Preferred metal cations have at least two chemically accessible oxidation states separated by only one difference in charge. Metal cations may be incorporated in their lower oxidation state or their higher oxidation state. Examples of suitable metal cations include, for example, transition metal cations (including lanthanide and actinide metal cations) having at least two chemically accessible oxidation states.

Preferred metal cations include vanadium, chromium, manganese, iron, cobalt, nickel, copper, molybdenum, ruthenium, rhodium, palladium, antimony, platinum, and cerium. More preferred metal cations include vanadium, chromium, manganese, iron, cobalt, nickel, copper, ruthenium, palladium and antimony cations. Most preferred metal cations include manganese, iron, cobalt, and copper metal cations due to their low cost, high activity, and good hydrolytic stability. Particularly most preferred cations are copper and iron.

Metal salts useful in the present invention comprise at least one counterion (X) having charge –m where m ranges from about 1 to 3. Examples of suitable counterions include halides, borates, sulfonates, and carboxylates. Preferred counterions include chloride, bromide, tetrafluoroborate, trifluoromethanesulfonate, naphthenate, and 2-ethylhexanoate.

Additionally, the metal cation may be ligated by n ligand molecules (L), which are covalently bonded to the metal. The number of ligands n ranges from 0 to 10. These ligands include traditional coordination compound ligands such as water, ammonia and amines as well as ligands such as carbonyl (carbon monoxide), isonitriles, phosphines, phophites, arsines, nitrosyl (nitric oxide), and pi electron donating ligands such as ethylene and other alkenes.

Examples of suitable metal salts include copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, and palladium (II) bromide.

The metal salt should be present in an effective amount, that is, enough to effect cure kinetics but not so much as to deleteriously affect the final properties of the bonding composition. An generally effective amount of metal salt is up to about 40,000 parts per million (ppm) based on the bonding composition, more preferably about 60 ppm to about 20,000 ppm, and most preferably about 100 ppm to about 4,000 ppm. The metal salt is preferably soluble in the polymerizable composition or at least partially dissolves in the bonding composition during use.

Preferred bonding compositions of the present invention have a worklife as defined in the Worklife Test Method set forth herein below of about 5 minutes or greater, more preferably about 10 minutes or greater, and most preferably about 20 minutes or greater.

Decomplexer:

When complexed organoborane initiators are used as the organoborane initiator in bonding compositions of the present invention, the bonding compositions further comprise a decomplexer. The term "decomplexer" as used herein refers to a compound capable of liberating the initiator (e.g., organoborane) from its complexing agent, thereby enabling initiation of the polymerizable monomer of the bonding composition. Decomplexers may also be referred to as "activators" or "liberators" and these terms may be used synonymously herein.

When the organoborane is complexed with an amine, a suitable decomplexer is an amine reactive compound. The amine reactive compound liberates organoborane by reacting with the amine, thereby removing the organoborane from chemical attachment with the amine. A wide variety of materials may be used to provide the amine reactive compound including combinations of different materials. Desirable amine reactive compounds are those materials that can readily form reaction products with amines at or below room temperature so as to provide a composition such as an adhesive that can be easily used and cured under ambient conditions. General classes of useful amine reactive compounds include acids, anhydrides, aldehydes and β-ketone compounds. Isocyanate, acid chloride, sulfonyl chloride, and the like such as isophorone diisocyanate, toluene diisocyanate and methacryloyl chloride may also be used.

Any acid that can liberate the organoborane by salting the amine group may be employed. Useful acids include Lewis acids (e.g., $SnCl_4$, $TiCl_4$ and the like) and Bronsted acids (e.g., carboxylic acids, HCl, $H_2SO_4$, $H_3PO_4$, phosphonic acid, phosphinic acid, silicic acid, and the like). Useful carboxylic; acids include those having the general formula $R^{20}$—COOH, where $R^{20}$ is hydrogen, an alkyl group of 1 to 8 and preferably 1 to 4 carbon atoms, or an aryl group of 6 to 10, preferably 6 to 8 carbon atoms. The alkyl groups may comprise a straight chain or they may be branched. They may be saturated or unsaturated. The aryl groups may contain substituents such as alkyl, alkoxy or halogen moieties. Illustrative acids of this type include acrylic acid, methacrylic acid, acetic acid, benzoic acid, and p-methoxybenzoic acid.

If it is desirable to provide a polymerizable composition that has less odor, an alkenyl group having a larger number of carbon atoms is recommended. In this event, $R^{20}$ may be a straight or branched chain, saturated or unsaturated alkenyl group of at least 9 carbon atoms, more preferably at least about 11 carbon atoms, and most preferably at least about 15 carbon atoms.

Other carboxylic acids useful as the amine reactive compound include dicarboxylic acids and carboxylic acid esters. Such compounds may be represented by the following general structure:

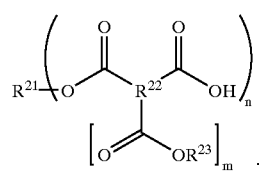

$R^{21}$ is hydrogen, a monovalent organic group (preferably having about 18 atoms or less, more preferably about 8 atoms or less), or a multivalent organic group (preferably having about 30 atoms or less, more preferably about 10 atoms or less). $R^{22}$ is multi-valent organic group (preferably having about 8 atoms or less, more preferably about 4 atoms or less). $R^{23}$ is hydrogen or a monovalent organic group (preferably having about 18 atoms or less, more preferably about 8 atoms or less). The integral value of "m" is 0, 1 or 2, and the integral value of "n" is greater than or equal to one, preferably 1 to 4, more preferably 1 or 2.

More preferably m is 0 so as to yield carboxylic acids represented by the following general structure:

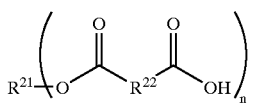

wherein $R^{21}$, $R^{22}$, and n are as previously defined.

The "organic groups" referred to in conjunction with $R^{21}$, $R^{22}$ and $R^{23}$ may be an aliphatic group (which may be saturated or unsaturated, and linear or branched), a cycloaliphatic group, an aromatic group, or an oxygen-, nitrogen-, or sulfur-containing heterocyclic group. When $R^<$ is hydrogen, m is zero, and n is one, the resulting compounds are dicarboxylic acids, useful examples of which include: oxalic acid; malonic acid; succinic acid; glutaric acid; adipic acid; maleic acid; fumaric acid; phthalic acid; isophthalic acid; and terephthalic acid. When, $R^{21}$ is an aliphatic group, n is one, and m is zero, the resulting compounds are carboxylic acid esters, useful examples of which include: 1,2-ethylene bismaleate; 1,2-propylene bismaleate; 2,2'-diethyleneglycol bismaleate; 2,2'-dipropyleneglycol bismaleate; and trimethylolpropane trismaleate.

Also preferred as the amine reactive compound are materials having at least one anhydride group, such materials preferably having one of the following structures:

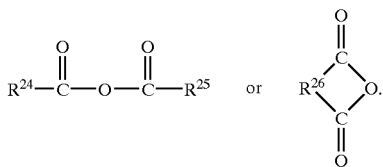

$R^{24}$ and $R^{25}$ are organic radicals which independently may be aliphatic (including straight- and branched-chain arrangements that may be saturated or unsaturated), cycloaliphatic, or aromatic. Preferred aliphatic groups comprise 1 to 17 carbon atoms, more preferably 2 to 9 carbon atoms. Preferred aromatic groups include benzene which may be substituted with 1 to 4 carbon atom aliphatic groups.

$R^{26}$ is a divalent organic radical that completes a cyclic structure with the anhydride group to form, for example, a 5- or 6-membered ring. $R^{26}$ may be substituted with aliphatic, cycloaliphatic or aromatic groups, preferably aliphatic groups comprising 1 to 12, more preferably 1 to 4 carbon atoms. $R^{26}$ may also contain heteroatoms such as oxygen or nitrogen provided that any heteroatom is not adjacent to the anhydride functionality. $R^{26}$ may also be part of a cycloaliphatic or aromatic fused ring structure, either of which may be optionally substituted with aliphatic groups. The presence of a free-radically polymerizable group in the anhydride-functional amine reactive compound may permit the same to polymerize with the acrylic monomers.

Aldehydes useful as the amine-reactive compound have the formula:

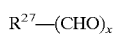

where $R^{27}$ is a monovalent organic radical, such as is an alkyl group of 1 to 10 carbon atoms (preferably 1 to 4), or an aryl group having 6 to 10 carbon atoms (preferably 6 to 8), and x is 1 or 2 (preferably 1). In this formula, the alkyl groups may be straight or branch-chained, and may contain substituents such as halogen, hydroxy and alkoxy. The aryl groups may contain substituents such as halogen, hydroxy, alkoxy, alkyl and nitro. The preferred $R^{27}$ group is aryl. Illustrative examples of compounds of this type include, benzaldehyde, o-, m- and p-nitrobenzaldehyde, 2,4-dichlorobenzaldehyde, p-tolylaldehyde and 3-methoxy-4 hydroxybenzaldehyde. Blocked aldehydes such as acetals may also be used in this invention.

β-Ketone compound decomplexers are reported, for example, in U.S. Ser. No. 10/037,074 "Initiator Systems Comprising β-Ketone Compounds and Bonding compositions Made Therewith" (Moren)) filed on an even date herewith. β-Ketone compound decomplexers have a structure represented by formula (1) or formula (2):

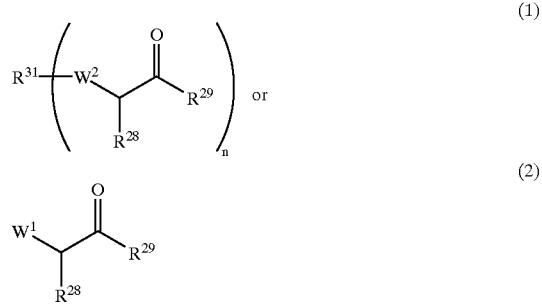

wherein for formula (1):
  $R^{28}$ is hydrogen or an organic group;
  $R^{29}$ is an organic group;
  $W^2$ is an electron withdrawing group selected from the group consisting of
    —$O_2C$—, —(CO)—, —HN(CO)—, and —$NR^{30}$(CO)—;
    where $R^{30}$ is an organic group;
  $R^{31}$ is an organic group having valence n; and
  n is an integer greater than zero;
  and wherein for formula (2):
    $R^{28}$ and $R^{29}$ are as defined above; and
    $W^1$ is an electron withdrawing group selected from the group consisting of
      NC— and $H_2N$(CO)—.

Preferred β-ketone compound decomplexers are selected from the group consisting of methyl acetoacetate, ethyl acetoacetate, t-butyl acetoacetate, 2-methacryloyloxyethyl acetoacetate, diethylene glycol bis(acetoacetate), polycaprolactone tris(acetoacetate), polypropylene glycol bis(acetoacetate), poly(styrene-co-allyl acetoacetate), N,N-dimethylacetoacetamide, N-methylacetoacetamide, acetoacetanilide, ethylene bis(acetoacetamide), polypropylene glycol bis(acetoacetamide), acetoacetamide, and acetoacetonitrile.

The decomplexer is employed in an effective amount (i.e., an amount effective to promote polymerization by liberating the initiator from its complexing agent, but without materially adversely affecting desired properties of the ultimate polymerized composition). As recognizable to one of ordinary skill in the art, too much of the decomplexer may cause polymerization to proceed too quickly and, in the case of adhesives, the resulting materials may demonstrate inadequate adhesion to low energy surfaces. However, if too little decomplexer is used, the rate of polymerization may be too slow and the resulting polymers may not be of adequate molecular weight for certain applications. A reduced amount of decomplexer may be helpful in slowing the rate of polymerization if it is otherwise too fast. Thus, within these parameters, the decomplexer is typically provided in an amount such that the ratio of amine-, amidine-, hydroxide- or alkoxide-reactive groups in the decomplexer(s) to amine, amidine, hydroxide or alkoxide groups in the complexing agent(s) is in the range of 0.5:1.0 to 10.0:1.0. For better performance, preferably the ratio of amine-, amidine-, hydroxide- or alkoxide-reactive groups in the decomplexer (s) to amine, amidine, hydroxide or alkoxide groups in the complexing agent(s) is in the range of 0.5: 1.0 to 4.0:1.0, preferably about 1.0:1.0.

Polymerizable Monomers:

Bonding compositions of the present invention include at least one polymerizable monomer. Broadly, the polymerizable monomer in a bonding composition of the present is invention includes at least one ethylenically unsaturated monomer capable of free radical polymerization. Numerous compounds containing ethylenic unsaturation can be used in the bonding composition. Preferably, the composition includes at least one (meth)acrylic monomer, most preferably at least one methacrylic monomer. As used herein the terms "(meth)acrylate" and "(meth)acrylic" and the plural forms thereof are meant to include both the acrylate and methacrylate species of the designated compound. For example, the term "ethyl (meth)acrylate" is meant to include ethyl acrylate and ethyl methacrylate. Particularly preferred are (meth)acrylic acid derivatives, such as those including esters and/or (meth)acrylamides. Suitable are, for example, the (meth)acrylic esters of monohydric alcohols, particularly alkanols having from 1 to 12 carbon atoms, such as methyl (meth)acrylate, ethyl (meth)acrylate, butyl (meth)acrylate, n-hexyl (meth)acrylate, cyclohexyl (meth)acrylate, isooctyl (meth)acrylate, isobornyl (meth)acrylate, isodecyl (meth) acrylate, ethylhexyl (meth)acrylate; the (meth)acrylic esters of monohydric alcohols further including heteroatoms, such as tetrahydrofurfuryl (meth)acrylate and 2-ethoxyethyl (meth)acrylate; the (meth)acrylic acid esters of polyhydric alcohols, such as ethylene glycol, diethylene glycol, polyethylene glycol, trimethylol propane, triethylene glycol, tetraethylene glycol, dipropylene glycol, tripropylene glycol, tetrapropylene glycol, pentapropylene glycol and polypropylene glycol; ethoxylated or propoxylated diphenylolpropane and hydroxy-terminated polyurethanes. (Meth)acrylic acid esters of polyhydric alcohols are hereinafter referred to as oligomeric (meth)acrylates.

Basically suitable are also polymerizable monomers, such as vinyl acetate; vinyl halides, such as vinyl chloride, vinyl fluoride, and vinyl bromide. These compounds, however, are generally used only in subordinate amounts in the polymerizable compositions.

Further suitable polymerizable monomers are (meth) acrylamides, such as N,N-dimethylacrylamide, N,N-diethylacrylamide, N-t-butylacrylamide, N-(acryloyl) morpholine, and N-(acryloyl)piperidine.

In general, the emphasis is on monomers with one or two olefinic double bonds in the molecule, preferably one olefinic double bond. The additional use of higher unsaturated components is not excluded, but it must be kept in mind that their presence may adversely affect worklife and/or physical performance.

Additives:

Bonding compositions of the present invention may further comprise optional additives. One particularly useful additive is a thickener, such as medium (i.e., about 40,000) molecular weight polybutyl methacrylate that may generally be incorporated in an amount of up to about 50%-wt., based on the total weight of the polymerizable monomer. Thickeners may be employed to increase the viscosity of the resulting bonding composition to a more easily applied viscous syrup-like consistency.

Another particularly useful additive is an elastomeric material. These materials can improve the fracture toughness of bonding compositions made therewith, which can be beneficial when, for example, bonding stiff, high yield strength materials (e.g., metal substrates that do not mechanically absorb energy as easily as other materials, such as flexible polymeric substrates). Such additives can generally be incorporated in an amount of up to about 50%-wt., based on the total weight of the bonding composition.

Core-shell polymers can also be added to modify spreading and flow properties of the bonding composition. These enhanced properties may be manifested by a reduced tendency for the bonding composition to leave an undesirable "string" upon dispensing from a syringe-type applicator, or sag or slump after having been applied to a vertical surface. Accordingly, use of more than about 20%-wt., based on total weight of the bonding composition, of a core-shell polymer additive may be desirable for achieving improved sag-slump resistance. Core-shell polymers can also improve the fracture toughness of bonding compositions made therewith, which can be beneficial when, for example, bonding stiff, high yield strength materials (e.g., metal substrates that do not mechanically absorb energy as easily as other materials, such as flexible polymeric substrates).

Reactive diluents may also be added to bonding compositions of the present invention. Suitable reactive diluents include 1,4-dioxo-2-butene functional compounds as reported in U.S. Pat. No. 6,252,023 (Moren) and aziridine functional compounds as reported in U.S. Pat. No. 5,935,711 (Pocius et al.).

Vinyl aromatic compounds of the type reported in PCT Publication WO 01/68783 (Moren) may also be incorporated into bonding compositions of the present invention.

Small amounts of inhibitors, such as hydroquinone monomethyl ether and tris (N-nitroso-N-phenylhydroxylamine) aluminum salt may be used in the polymerizable compositions, for example, to prevent or reduce degradation of the polymerizable monomers during storage. Inhibitors may be added in an amount that does not materially affect the rate of polymerization or the ultimate properties of polymers made therewith. Accordingly, inhibitors are generally useful in amounts of about 100–10,000 ppm based on the total weight of the polymerizable monomers in the polymerizable composition.

Other possible additives include non-reactive colorants, fillers (e.g., carbon black, hollow glass/ceramic beads, silica, titanium dioxide, solid glass/ceramic spheres, electrically and/or thermally conductive particulate, antistatic compounds, and chalk), and the like. The various optional additives are employed in any amount, but generally amounts that do not significantly adversely affect the polymerization process or the desired properties of polymers made therewith.

Bonding compositions of the invention are especially useful for adhesively bonding low surface energy plastic or polymeric substrates that historically have been very difficult to bond without using complicated surface preparation techniques, for example, priming. By low surface energy substrates is meant materials that have a surface energy of less than 45 mJ/m$^2$, more typically less than 40 mJ/m$^2$ or less than 35 mJ/m$^2$. Included among such materials are polyethylene, polypropylene, acrylonitrile-butadiene-styrene, and fluorinated polymers such as polytetrafluoroethylene (TEFLON) which has a surface energy of less than 20 mJ/m. (The expression "surface energy" is often used synonymously with "critical wetting tension" by others.) Other polymers of somewhat higher surface energy that may be usefully bonded with the compositions of the invention include polycarbonate, polymethylmethacrylate, and polyvinylchloride.

The bonding compositions of the invention can be easily provided as two-part formulations. The acrylic monomers are blended as would normally be done when working with such materials. The bonding compositions of the present invention are preferably provided in two-part formulation with the parts being mixed prior to application of the bonding composition to a substrate. In this way, the polymerizable monomers may be separated from the organoborane initiator until cure (i.e., polymerization) of the bonding composition is desired. Accordingly, the first part or "Part A" of the two-part bonding composition comprises an organoborane initiator (preferably a complexed organoborane initiator) and may further comprise optionally additives, for example, a reactive diluent or plasticizer. The second part or "Part B" of the two-part bonding composition comprises at least one polymerizable monomer, and further comprises a decomplexer in the case where the organoborane initiator in Part A is complexed (e.g., an organoborane amine complex). Part B part may further comprise optional additives, for example, microspheres or a core-shell polymer. In bonding compositions of the present invention, a metal salt is included in Part A, Part B, or both Part A and Part B.

For a two-part bonding composition such as those of the invention to be most easily used in commercial and industrial environments, the ratio at which the two parts are combined should be a convenient whole number. This facilitates application of the adhesive with conventional, commercially available dispensers. Such dispensers are shown in U.S. Pat. Nos. 4,538,920 and 5,082,147 and are available from ConProTec, Inc. (Salem N.H.) under the tradename "MIXPAC" and are sometimes described as dual syringe-type applicators.

Typically, these dispensers use a pair of tubular receptacles arranged side-by-side with each tube being intended to receive one of the two parts of the adhesive. Two plungers, one for each tube, are simultaneously advanced (e.g., manually or by a hand-actuated ratcheting mechanism) to evacuate the contents of the, tubes into a common, hollow, elongated mixing chamber that may also contain a static mixer to facilitate blending of the two parts. The blended bonding composition is dispensed from the mixing chamber onto a substrate. Once the tubes have been emptied, they can be replaced with fresh tubes and the application process continued.

The ratio at which the two parts of the bonding composition are combined is controlled by the diameter of the tubes. (Each plunger is sized to be received within a tube of fixed diameter, and the plungers are advanced into the tubes at the same speed.) A single dispenser is often intended for use with a variety of different two-part bonding compositions and the plungers are sized to deliver the two parts of the bonding composition at a convenient mix ratio. Some common mix ratios are 1:1, 1:2, 1:4 and 1:10.

If the two parts of the bonding composition are combined in an odd mix ratio (e.g. 3.5:100), then the ultimate user would probably manually weigh the two parts of the adhesive. Thus, for best commercial and industrial utility and for ease of use with currently available dispensing equipment, the two parts of the bonding composition should be capable of being combined in a common, whole number mix ratio such as 1:10 or less, more preferably 1:4, 1:3, 1:2 or 1:1.

Bonding compositions of the invention are suited for use with conventional, commercially available dispensing equipment for two-part adhesives. The solubility of the organoborane in the vinyl aromatic compound can be advantageously used to modify the mix ratio of the two parts of the adhesive composition to the most commercially important whole number values (e.g., 1:10, 1:4, 1:3, 1:2 or 1:1).

Once the two parts have been combined, the bonding composition should preferably be used within a period of time less than or equal to the worklife of the bonding composition. The bonding composition is applied to one or both substrates and then the substrates are joined together with pressure to force excess composition out of the bond line. This also has the advantage of displacing bonding composition that has been exposed to air and that may have advanced too far in cure. In general, the bonds should be made shortly after the composition has been applied to the substrate, preferably within a period of time less than or equal to the worklife of the bonding composition. The typical bond line thickness is about 0.1 to 0.3 mm but may exceed 1.0 mm when gap filling is needed. The bonding process can easily be carried out at room temperature and to improve the degree of polymerization it is desirable to keep the temperature below about 40° C. Full strength will normally be reached in less than 24 hours under ambient conditions. Post-curing at an elevated temperature may also be used if desired.

The invention will be more fully appreciated with reference to the following nonlimiting examples.

EXAMPLES

These examples are merely for illustrative purposes and are not meant to be limiting on the scope of the appended claims. All parts, percentages, ratios, etc. in the examples and the rest of the specification are by weight unless indicated otherwise. Various tradenames and abbreviations used in the examples are defined according to the following Table of Abbreviations:

| Table of Abbreviations | |
|---|---|
| Trade Designation or Other Abbreviation | Description |
| ARCAL SAA100 | poly(styrene-co-allyl alcohol), nominal Mn 1130, nominal Mw 2200, available from ARCO Chemical Company; Newton Square, PA. |
| t-BuAcAc | t-butyl acetoacetate, available from Aldrich Chemical Company; Milwaukee, WI. |
| DEG | diethylene glycol, available from Aldrich Chemical Company. |
| TMI | 3-isopropenyl-α,α-dimethylbenzylisocyanate, available from Cytec Industries, Inc.; West Peterson, NJ. |
| Jeffamine D2000 | amine terminated polypropylene glycol, nominal molecular weight 2000, available from Huntsman Petrochemical Corp; Houston, TX. |

-continued

Table of Abbreviations

| Trade Designation or Other Abbreviation | Description |
|---|---|
| Triethylborane | available from Aldrich Chemical Company. |
| 1,6-hexanediamine | available from Aldrich Chemical Company. |
| Blendex 360 | core-shell toughener, available from GE Specialty Chemicals; Parkersburg, WV. |
| THFMA | tetrahydrofurfuryl methacrylate, available from Sartomer Company; Exton, PA. |
| Z-Light W1600 | ceramic microspheres (100–350 micron diameter), available from 3M Company; St. Paul, MN. |
| copper (II) bromide | available from Strem Chemical Company, Newburyport, MA. |
| N,N-dimethylacrylamide | available from Alfa-Aesar Company, Ward Hill, MA. |
| MAEAcAc | 2-methacryloyloxyethyl acetoacetate, available from Aldrich Chemical Company. |
| dibutyl maleate | Available from C. P. Hall Company, Chicago, IL. |
| MAEMal | 2-methacryloyloxyethyl maleate, available from Aldrich Chemical Company. |
| MAESucc | 2-methacryloyloxyethyl succinate, available from Aldrich Chemical Company. |
| EtHexMal | 2-ethylhexyl maleate, available from Aldrich Chemical Company |
| PhNHAcAc | acetoacetanilide, available from Aldrich Chemical Company. |
| TMXDI | α,α,α',α'-tetra-methylxylylenediisocyanate, available from Cytec Industries, Inc.; West Peterson, NJ. |
| HHPhAnh | hexahydrophthalic anhydride, available from Aldrich Chemical Company. |
| PPM | Parts per million |
| Psi | Pounds per square inch 1 psi = 0.006895 MegaPascals |

Adhesive Test Methods

Overlap Shear Bond Strength Test Method

Each bonding composition was applied directly onto an untreated 2.5 cm×10 cm×0.3 cm (1 inch×4 inch×0.125 inch) test panel and an untreated second test panel was immediately placed against the bonding composition on the first test panel so that the overlapped area was 1.3 cm×2.5 cm (0.5 inch×1 inch). A clamp was applied to the overlapped area. The test panels were high-density polyethylene (HDPE) (Minnesota Plastics; Minneapolis, Minn.) and polypropylene (PP) (Cadillac Plastics; Minneapolis, Minn.). A small amount of bonding composition squeezed out of the overlapped area and was allowed to remain.

The bonds were allowed to cure for at least 48 hours at 22° C. The clamps were then removed, and the overlap bonds were tested in shear (OLS) on a tensile tester at a crosshead speed of 1.27 cm/minute (0.5 inch/minute). The overlap shear values were recorded in pounds per square inch and were converted into megapascals (MPa). Overlap shear values represent the average value of three replicates.

Worklife Test Method

This test measures overlap shear bond strength as a function of adhesive air exposure time prior to bond formation. The Overlap Shear Bond Strength Test Method above was followed, except that a bare second test panel was not immediately pressed into the adhesive laden first test panel, rather each bonding composition was applied directly onto an untreated test panel, the assembly was allowed to stand in air for the Open Time stated in the Examples, and then an untreated second test panel was placed against the air-aged bonding composition on the first test panel to provide an overlapped area. The maximum Open Time resulting in either 1) substrate yield without bond rupture or 2) bond rupture exhibiting 100% cohesive failure of the adhesive and resulting in an overlap shear value which is at least 95% of the overlap shear value measured according to the Overlap Shear Bond Strength Test Method above defines adhesive Worklife (also referred to as "WL"). Overlap shear values represent the average value of two replicates.

Rate of Overlap Shear Bond Strength Increase Test Method

This test measures overlap shear bond strength of partially cured bonding composition as a function of cure time. The Overlap Shear Bond Strength Test Method above was followed, except that the bonds were not allowed to cure for at least 48 hours at 22° C., rather the bonds were allowed to cure at 22° C. for the time specified in the Examples. The clamps were then removed, and the overlap bonds were tested in shear. The time to reach 50 psi (0.34 MPa) overlap shear strength was estimated graphically and is reported as "T50". Overlap shear values represent the average of two replicates.

Peel Bond Strength Test Method

Each bonding composition was applied directly onto an untreated 0.8 mm (30 mil)-thick high-density polyethylene (HDPE) film (available from Cadillac Plastics; Minneapolis, Minn.). A second untreated HDPE film was pressed into the bonding composition and held in contact using a 1.2 kg (2.7 lb) weighted glass plate. Sufficient bonding composition was applied to the first film to provide minimum bond dimensions of 2.5 cm (1 inch) in width by 5 cm (2 inch) in length.

The bonded adherends were allowed to cure for 24 hours at 22° C. The samples were uncovered and allowed to cure at least 24 hours additionally at 22° C., then slit to 1 inch (2.54 cm) width, then tested for bond strength in the T-peel mode using a tensile tester set at a crosshead speed of 10.2 cm/min (4 inches/min). Two overlapping free ends of the sample were clamped into the jaws of the tensile tester, one free end in the upper jaw and one free end in the lower jaw. The jaws were then pulled apart until at least 2.5 cm (1 inch) of adhesive was exposed or until adherend failure was observed. The average force per width during the run after the adhesive was initially exposed was recorded as the peel strength in pounds per inch-width and was converted into Newtons/cm (N/cm).

β-Ketone Functional Oligomer and Polymer Synthesis

Synthesis Example S1—Poly(styrene-co-allyl Acetoacetate) Synthesis

ARCAL SAA100 (57.80 grams, 0.20 equivalents OH) and t-butyl acetoacetate (31.60 grams, 0.20 mole) were combined and heated to a 200° C. end point t-Butyl alcohol was distilled and collected (14.35 grams, 97% of theoretical). The poly(styrene-co-allyl acetoacetate) product cooled to a clear, hard glass. The adduct is hereinafter referred to "p(Sty-AAcAc)".

Synthesis Examples S2

Synthesis Example S1 was repeated, but using diethylene glycol (10.60 grams, 0.20 equivalents OH) in place of ARCAL SAA100. t-Butyl alcohol recovery was greater than 95% of theoretical. The acetoacetate functional oligomer cooled to a moderately viscous liquid. The adduct is hereinafter referred to "DEGAcAc2".

α-Methylstyrene Functional Oligomer Synthesis

Synthesis Example S3

TMI (120.60 grams, 0.60 mole) and Jeffamine D2000 (600.00 grams, 0.60 equivalents amine) were combined and allowed to react without external temperature control. After standing at room temperature overnight, infrared spectroscopy indicated complete reaction by disappearance of the 2265 $cm^{-1}$ isocyanate band. The α-methylstyrene functional oligomer product is hereinafter referred to as "AMSPU2400".

Methacrylate Terminated Polyurethane Synthesis

Synthesis Example S4

2,4-Tolylenediisocyanate terminated polypropylene glycol (493.00 grams, 1.00 isocyanate equivalents) (Aldrich #43,348-9, nominal molecular weight 1000), 2-hydroxyethyl methacrylate (143.14 grams, 1.10 mole, Aldrich), 2,6-di-t-butyl-4-methylphenol (0.06 grams, Aldrich), and dibutyltin dilaurate (0.30 grams, Aldrich) were combined sequentially and allowed to react without external temperature control for one hour, then heated to 70° C. for four hours. Infrared spectroscopy indicated complete reaction by disappearance of the 2265 $cm^{-1}$ isocyanate band. The methacrylate terminated polyurethane product is hereinafter referred to as "PUMA 1250".

Examples 1–10 and Comparative Example C1

Initiator Component

A 2:1 mole ratio triethylborane: 1,6-hexanediamine complex (32.00 grams) was dissolved in AMSPU2400 (168.00 grams). The air bubbles were allowed to rise and escape. This Initiator Component is hereinafter referred to as "Initiator Component A" and is used in all of Examples 1–10 and Comparative Example C1.

Polymerizable Composition

A slurry containing Blendex 360 (202.50 grams), THFMA (511.50 grams), and AMSPU2400 (19.50 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. Z-Light W1600 (16.50 grams) was added to the warm dispersion and mixed well. This monomer blend is hereinafter referred to as "Monomer Blend A".

A slurry of copper (II) bromide (4.00 grams) in dimethylacrylamide (4.00 grams) was heated to form a homogeneous black solution. This copper (II) bromide solution is hereinafter referred to as "Metal Salt Solution A". In some Examples a second copper (II) bromide solution, "Metal Salt Solution B", was used. Metal Salt Solution B was prepared by combining 0.20 grams of Metal Salt Solution A with 0.80 grams dimethylacrylamide.

To prepare each example, Monomer Blend A was combined with MAEAcAc and a portion of Metal Salt Solution A or Metal Salt Solution B to form a Polymerizable Composition as described in Table 1. Air bubbles were removed from the Polymerizable Composition by briefly stirring under vacuum.

Adhesive

Each Polymerizable Composition and Initiator Component A were packaged in a 10:1 volume ratio dual syringe applicator (MixPac System 50, Kit No. MP-050-10-09, available from ConProTec; Salem, N.H.), the larger cylinder holding the Polymerizable Composition and the smaller cylinder holding the Initiator Component. The two parts were combined by simultaneous extrusion through a 10 cm (4 inch) long, 17-stage static mix nozzle (Part No. MX 4-0-17-5, ConProTec). Test specimens were prepared and tested according to the Test Methods outlined above, the results are presented in Tables 2–4. In Table 5 the time to 0.34 MPa HDPE OLS (T50), Worklife (WL) and the T50/WL ratio were estimated for Examples 1–10 and Comparative Example C1.

TABLE 1

| Example | Weight Monomer Blend A (grams) | Weight MAEAcAc (grams) | Weight (grams) and Identity of Metal Salt Solution | Copper (II) Bromide Concentration in Polymerizable Composition (ppm) |
|---|---|---|---|---|
| 1 | 45.77 | 4.18 | 0.05 Metal Salt Solution A | 500 |
| 2 | 45.79 | 4.18 | 0.03 Metal Salt Solution B | 60 |
| 3 | 45.76 | 4.18 | 0.06 Metal Salt Solution B | 120 |
| 4 | 45.70 | 4.18 | 0.12 Metal Salt Solution B | 240 |
| 5 | 45.72 | 4.18 | 0.10 Metal Salt Solution A | 1000 |
| 6 | 45.62 | 4.18 | 0.20 Metal Salt Solution A | 2000 |
| 7 | 44.82 | 4.18 | 1.00 Metal Salt Solution A | 10,000 |
| 8 | 43.82 | 4.18 | 2.00 Metal Salt Solution A | 20,000 |
| 9 | 41.82 | 4.18 | 4.00 Metal Salt Solution A | 40,000 |
| 10 | 37.82 | 4.18 | 8.00 Metal Salt Solution A | 80,000 |
| C1 | 45.82 | 4.18 | none | none |

TABLE 2

| Example | HDPE OLS (MPa) | PP OLS (MPa) |
|---|---|---|
| 1 | 6.69 | NT |
| 2 | 5.89 | 1.90 |
| 3 | 6.12 | 1.54 |
| 4 | 6.09 | 1.72 |
| 5 | 6.39 | NT |
| 6 | 6.78 | 1.66 |
| 7 | 5.86 | NT |
| 8 | 5.94 | NT |
| 9 | 0.73 | NT |
| 10 | 0.21 | NT |
| C1 | NT | NT |

NT signifies that performance was not tested.

TABLE 3

| Example | OLS at 10 min Open Time (MPa) | OLS at 20 min Open Time (MPa) | OLS at 30 min Open Time (MPa) | OLS at 40 min Open Time (MPa) | OLS at 45 min Open Time (MPa) | OLS at 50 min Open Time (MPa) | OLS at 60 min Open Time (MPa) |
|---|---|---|---|---|---|---|---|
| 1 | 6.09 | 6.63 | 6.61 | 6.63 | NT | 6.15 | 6.09 |
| 2 | 5.62 | 2.54 | 0.49 | NT | NT | NT | NT |
| 3 | 6.10 | 5.99 | 2.41 | NT | NT | NT | NT |
| 4 | 5.93 | 6.11 | 6.08 | 2.62 | NT | NT | NT |
| 5 | 6.66 | 6.63 | 6.63 | 6.64 | NT | 6.61 | 6.54 |
| 6 | 6.66 | 6.31 | 6.04 | NT | NT | 6.61 | 6.48 |
| 7 | NT | NT | 6.00 | NT | 6.03 | NT | 5.92 |
| 8 | NT | NT | 5.68 | NT | 5.99 | NT | 5.97 |
| 9 | NT | NT | 2.76 | NT | 2.52 | NT | 1.50 |
| 10 | NT | NT | 0.50 | NT | 0.89 | NT | 0.63 |
| C1 | 6.61 | 2.23 | NT | NT | NT | NT | NT |

NT signifies that performance was not tested.

TABLE 4

| Example | OLS at 45 min. cure (MPa) | OLS at 60 min. cure (MPa) | OLS at 75 min. cure (MPa) | OLS at 90 min. cure (MPa) | OLS at 105 min. cure (MPa) | OLS at 120 min. cure (MPa) | OLS at 135 min. cure (MPa) | OLS at 150 min. cure (MPa) | OLS at 165 min. cure (MPa) | OLS at 180 min. cure (MPa) |
|---|---|---|---|---|---|---|---|---|---|---|
| 1 | 0 | 0.03 | 0.12 | 0.62 | 2.70 | NT | NT | NT | NT | NT |
| 2 | 0.14 | 0.20 | 0.55 | 1.08 | 1.64 | NT | NT | NT | NT | NT |
| 3 | 0.05 | 0.11 | 0.36 | 0.70 | 1.26 | NT | NT | NT | NT | NT |
| 4 | 0 | 0.06 | 0.23 | 0.92 | 1.59 | NT | NT | NT | NT | NT |
| 5 | 0.01 | 0.03 | 0.15 | 0.84 | 1.63 | NT | NT | NT | NT | NT |
| 6 | NT | 0.01 | NT | NT | 0.17 | 0.66 | 2.92 | NT | NT | NT |
| 7 | NT | NT | NT | NT | 0.01 | 0.04 | 0.09 | 0.17 | 0.22 | 0.90 |
| 8 | NT | NT | NT | NT | 0.09 | 0.12 | 0.26 | 0.31 | 0.39 | 0.92 |
| 9 | NT | NT | NT | NT | NT | NT | NT | NT | NT | NT |
| 10 | NT | NT | NT | NT | NT | NT | NT | NT | NT | NT |
| C1 | 0.14 | 0.34 | 0.57 | 1.08 | 1.64 | NT | NT | NT | NT | NT |

NT signifies that performance was not tested.

TABLE 5

| Example | Worklife (minutes) | T50 (minutes) | T50/WL ratio |
|---|---|---|---|
| 1 | 60 | 84 | 1.4/1 |
| 2 | 10 | 65 | 6.5/1 |
| 3 | 20 | 75 | 3.8/1 |
| 4 | 30 | 84 | 2.8/1 |
| 5 | 60 | 84 | 1.4/1 |
| 6 | 60 | 108 | 1.8/1 |
| 7 | 60 | 168 | 2.8/1 |
| 8 | 60 | 158 | 2.6/1 |
| 9 | ND | ND | ND |
| 10 | ND | ND | ND |
| C1 | 10 | 60 | 6/1 |

ND signifies that a value was not determined

TABLE 6

| Metal Salt Solution Designation | Weight Metal Salt (grams) and Identity of Metal Salt | Weight Dimethylacrylamide (grams) |
|---|---|---|
| Metal Salt Solution C | 4.00 $CuCl_2$—$2H_2O$ | 8.00 |
| Metal Salt Solution D | 4.00 $Cu(O_2CCH(Et)(CH_2)_3CH_3)_2$ | 4.00 |
| Metal Salt Solution E | 4.00 $FeBr_3$ | 4.00 |
| Metal Salt Solution F | 4.00 $FeCl_3$ | 6.00 |
| Metal Salt Solution G | 0.50 $VBr_3$ | 1.50 |
| Metal Salt Solution H | 0.50 $CrBr_3$—$6H_2O$ | 1.50 |
| Metal Salt Solution I | 0.50 $RuBr_3$—$xH_2O$ | 1.50 |
| Metal Salt Solution J | 0.50 $Cu(BF_4)_2$ | 1.50 |
| Metal Salt Solution K | 0.50 $Cu(O_3SCF_3)_2$ | 1.50 |
| Metal Salt Solution L | 0.50 $Cu(naphthenate)_2$ | 1.50 |
| Metal Salt Solution M | 1.00 $CuBr$ | 9.00 |
| Metal Salt Solution N | 1.00 $FeBr_2$ | 2.00 |

Examples 11–33 and Comparative Example C2

Different metal salt solutions were prepared as described in Table 6 according to the metal salt solution preparation description presented in Examples 1–10 above. All metal salts are commercially available from Strem Chemical Company, Newburyport, Mass.

TABLE 6-continued

| Metal Salt Solution Designation | Weight Metal Salt (grams) and Identity of Metal Salt | Weight Dimethylacrylamide (grams) |
|---|---|---|
| Metal Salt Solution O | 0.50 MnBr$_2$ | 1.50 |
| Metal Salt Solution P | 0.50 CoBr$_2$—xH$_2$O | 1.50 |
| Metal Salt Solution Q | 0.50 NiBr$_2$—xH$_2$O | 1.50 |
| Metal Salt Solution R | 0.50 SbBr$_3$ | 1.50 |
| Metal Salt Solution S | 0.50 PdBr$_2$ | 9.50 |
| Metal Salt Solution T | 1.29 ZnCl$_2$ | 3.87 |

Polymerizable Compositions were prepared as in Examples 1–10 and Comparative Example C1 except replacing Metal Salt Solution A with varying amounts of Metal Salt Solution C to T. Each Polymerizable Composition was packaged opposite Initiator Component A, as in Examples 1–10 and Comparative Example C1. Test specimens were prepared and tested according to the Test Methods outlined above. The results are summarized in Tables 8–10. In Table 11 the time to 0.34 MPa (50 psi) HDPE OLS (T50), Worklife (WL) and the T50/WL ratio were estimated for Examples 11–33.

TABLE 7

| Example | Weight Monomer Blend A (grams) | Weight MAEAcAc (grams) | Weight (grams) and Identity of Metal Salt Solution |
|---|---|---|---|
| 11 | 45.59 | 4.18 | 0.23 Metal Salt Solution C |
| 12 | 45.50 | 4.18 | 0.32 Metal Salt Solution D |
| 13 | 45.55 | 4.18 | 0.27 Metal Salt Solution E |
| 14 | 45.64 | 4.18 | 0.18 Metal Salt Solution F |
| 15 | 45.30 | 4.18 | 0.52 Metal Salt Solution G |
| 16 | 45.10 | 4.18 | 0.72 Metal Salt Solution H |
| 17 | 45.12 | 4.18 | 0.70 Metal Salt Solution I |
| 18 | 45.39 | 4.18 | 0.43 Metal Salt Solution J |
| 19 | 45.17 | 4.18 | 0.65 Metal Salt Solution K |
| 20 | 44.72 | 4.18 | 1.10 Metal Salt Solution L |
| 21 | 45.17 | 4.18 | 0.65 Metal Salt Solution M |
| 22 | 44.52 | 4.18 | 1.30 Metal Salt Solution M |
| 23 | 45.53 | 4.18 | 0.29 Metal Salt Solution N |
| 24 | 45.38 | 4.18 | 0.44 Metal Salt Solution N |
| 25 | 45.76 | 4.18 | 0.06 Metal Salt Solution E |
| 26 | 45.74 | 4.18 | 0.08 Metal Salt Solution I |
| 27 | 45.70 | 4.18 | 0.12 Metal Salt Solution L |
| 28 | 45.75 | 4.18 | 0.03 Metal Salt Solution N |
| 29 | 45.43 | 4.18 | 0.39 Metal Salt Solution O |
| 30 | 45.33 | 4.18 | 0.49 Metal Salt Solution P |
| 31 | 45.33 | 4.18 | 0.49 Metal Salt Solution Q |
| 32 | 45.17 | 4.18 | 0.65 Metal Salt Solution R |
| 33 | 43.42 | 4.18 | 2.40 Metal Salt Solution S |
| C2 | 43.82 | 4.18 | 2.00 Metal Salt Solution T |

TABLE 8

| Example | HDPE OLS (MPa) | PP OLS (MPa) |
|---|---|---|
| 11 | 6.70 | 1.20 |
| 12 | 6.14 | 0.37 |
| 13 | 6.78 | 1.66 |
| 14 | 3.86 | 4.14 |
| 15 | 5.86 | NT |
| 16 | 5.61 | NT |
| 17 | 1.77 | NT |
| 18 | 5.68 | NT |
| 19 | 5.75 | NT |
| 20 | 1.61 | NT |
| 21 | 5.89 | NT |
| 22 | 5.94 | NT |
| 23 | 3.03 | NT |
| 24 | 1.86 | NT |
| 25 | 5.97 | NT |
| 26 | 5.93 | NT |
| 27 | 5.48 | NT |
| 28 | 5.85 | NT |
| 29 | 5.69 | NT |
| 30 | 3.14 | NT |
| 31 | 2.66 | NT |
| 32 | 5.92 | NT |
| 33 | 5.83 | NT |
| C2 | 6.70 | 6.80 |

NT signifies that performance was not tested

TABLE 9

| Example | OLS at 10 min Open Time (MPa) | OLS at 20 min Open Time (MPa) | OLS at 30 min Open Time (MPa) | OLS at 40 min Open Time (MPa) | OLS at 45 min Open Time (MPa) | OLS at 50 min Open Time (MPa) | OLS at 60 min Open Time (MPa) |
|---|---|---|---|---|---|---|---|
| 11 | 6.71 | 6.30 | 6.53 | 6.61 | NT | 5.19 | 3.79 |
| 12 | 4.76 | 5.25 | 4.78 | 4.59 | NT | 3.17 | 1.78 |
| 13 | 6.31 | 2.82 | NT | NT | NT | NT | NT |
| 14 | 6.40 | 3.97 | NT | NT | NT | NT | NT |
| 15 | 3.77 | 4.01 | 1.26 | NT | NT | NT | NT |
| 16 | 5.63 | 3.41 | 2.12 | NT | NT | NT | NT |
| 17 | 2.29 | 1.67 | 1.37 | NT | 1.45 | NT | 1.53 |
| 18 | 4.16 | 2.39 | 0.58 | NT | 1.68 | NT | NT |
| 19 | 3.19 | 0.96 | 0.08 | NT | NT | NT | NT |
| 20 | 1.22 | 0.40 | 0.19 | NT | 0.34 | NT | NT |
| 21 | 5.89 | 5.97 | 5.92 | NT | 5.80 | NT | 5.81 |

TABLE 9-continued

| Example | OLS at 10 min Open Time (MPa) | OLS at 20 min Open Time (MPa) | OLS at 30 min Open Time (MPa) | OLS at 40 min Open Time (MPa) | OLS at 45 min Open Time (MPa) | OLS at 50 min Open Time (MPa) | OLS at 60 min Open Time (MPa) |
|---|---|---|---|---|---|---|---|
| 22 | 5.90 | 5.90 | 5.88 | NT | 5.30 | NT | 5.59 |
| 23 | 5.77 | 5.62 | 3.91 | NT | 1.10 | NT | 1.50 |
| 24 | 4.95 | 4.68 | 2.89 | NT | 1.95 | NT | 1.44 |
| 25 | 6.05 | 4.58 | 2.28 | NT | NT | NT | NT |
| 26 | 5.94 | 5.72 | 4.33 | NT | NT | NT | NT |
| 27 | 5.28 | 4.57 | 0.80 | NT | NT | NT | NT |
| 28 | 5.91 | 4.63 | 2.52 | NT | NT | NT | NT |
| 29 | 5.84 | 5.84 | 5.64 | NT | NT | NT | NT |
| 30 | 0.70 | 2.75 | 2.58 | NT | NT | NT | NT |
| 31 | 0.74 | 3.03 | 4.30 | NT | NT | NT | NT |
| 32 | 5.88 | 5.52 | 4.50 | NT | NT | NT | NT |
| 33 | 5.25 | 1.46 | 0.57 | NT | NT | NT | NT |
| C2 | 3.26 | 0.11 | 0.00 | NT | 0.00 | NT | 0.00 |

NT signifies that performance was not tested

TABLE 10

| Example | OLS at 45 min. cure (MPa) | OLS at 60 min. cure (MPa) | OLS at 75 min. cure (MPa) | OLS at 90 min. cure (MPa) | OLS at 105 min. cure (MPa) | OLS at 120 min. cure (MPa) | OLS at 135 min. cure (MPa) | OLS at 150 min. cure (MPa) |
|---|---|---|---|---|---|---|---|---|
| 11 | 0.01 | 0.01 | 0.02 | 0.12 | 0.46 | 2.59 | NT | NT |
| 12 | NT | NT | NT | NT | NT | NT | NT | NT |
| 13 | NT | NT | NT | NT | NT | NT | NT | NT |
| 14 | NT | NT | NT | NT | NT | NT | NT | NT |
| 15 | 0.11 | 0.54 | 1.14 | 2.28 | 3.28 | 4.36 | NT | NT |
| 16 | 0.08 | 0.10 | 0.16 | 0.11 | 0.21 | 0.41 | NT | NT |
| 17 | NT | NT | NT | NT | NT | NT | NT | NT |
| 18 | 0.06 | 0.26 | 1.46 | 4.86 | 5.35 | 5.28 | NT | NT |
| 19 | 0.08 | 0.38 | 3.33 | 5.79 | 5.60 | 5.89 | NT | NT |
| 20 | 0.06 | 0.98 | 1.26 | 1.23 | 0.95 | 1.32 | NT | NT |
| 21 | 0 | 0 | 0 | 0 | 0.03 | 0.12 | 1.93 | NT |
| 22 | 0 | 0 | 0 | 0 | 0 | 0.04 | 0.43 | NT |
| 23 | 0.03 | 0.05 | 0.04 | 0.10 | 0.09 | 0.14 | 0.20 | 0.26 |
| 24 | 0.01 | 0 | 0.01 | 0 | 0 | 0.04 | 0.19 | 0.05 |
| 25 | 0.08 | 0.15 | 0.23 | 0.35 | 0.37 | 0.48 | NT | NT |
| 26 | 0.05 | 0.14 | 0.24 | 0.28 | 0.42 | 0.52 | NT | NT |
| 27 | 0.10 | 0.43 | 1.57 | 2.81 | 3.21 | 4.00 | NT | NT |
| 28 | 0.04 | 0.15 | 0.19 | 0.28 | 0.41 | 0.47 | NT | NT |
| 29 | 0.06 | 0.10 | 0.25 | 0.58 | 0.75 | 1.68 | NT | NT |
| 30 | 0.14 | 0.24 | 0.68 | 0.62 | 1.10 | 1.98 | NT | NT |
| 31 | 0.14 | 0.12 | 0.28 | 0.34 | 0.43 | 0.51 | NT | NT |
| 32 | 0.12 | 0.17 | 0.27 | 0.28 | 0.48 | 0.68 | NT | NT |
| 33 | 0.08 | 0.15 | 0.34 | 0.62 | 0.85 | 1.32 | NT | NT |
| C2 | 0.07 | 0.21 | 0.49 | 0.75 | 0.98 | 1.46 | 1.65 | 2.91 |

NT signifies that performance was not tested.

TABLE 11

| Example | Worklife (minutes) | T50 (minutes) | T50/WL ratio |
|---|---|---|---|
| 11 | 40 | 101 | 2.5/1 |
| 12 | <10 | ND | ND |
| 13 | 10 | ND | ND |
| 14 | <10 | ND | ND |
| 15 | <10 | 55 | >5.5/1 |
| 16 | 10 | 120 | 12/1 |
| 17 | ND | ND | ND |
| 18 | <10 | 65 | >6.5/1 |
| 19 | <10 | 60 | >6/1 |
| 20 | ND | 55 | ND |
| 21 | 60 | 123 | 2/1 |
| 22 | 60 | 134 | 2.2/1 |
| 23 | 10 | ND | ND |
| 24 | 10 | ND | ND |
| 25 | 10 | 96 | 9.6/1 |
| 26 | 10 | 96 | 9.6/1 |
| 27 | <10 | 58 | >5.8/1 |
| 28 | 10 | 96 | 9.6/1 |
| 29 | 20 | 81 | 4/1 |
| 30 | <10 | 71 | >7/1 |
| 31 | <10 | 87 | >8.7/1 |
| 32 | 10 | 86 | 8.6/1 |
| 33 | <10 | 75 | >7.5/1 |
| C2 | <10 | 65 | >6.5/1 |

ND signifies that a value was not determined

Compared to Comparative Example C1 with no metal salt, Comparative Example C2 demonstrates the detrimental effect of zinc chloride on both worklife and rate of strength increase.

Examples 34–37

Examples 34–37 were prepared and evaluated as in Examples 1–10 and Comparative Example C1, except different Polymerizable Compositions and Initiator Components were prepared.

Two Initiator Components were prepared.

Initiator Component B

Poly(butyl methacrylate-co-methyl methacrylate) (Aldrich #47,403-7; molecular weight 150,000) (4.00 grams) and dibutyl maleate (6.00 grams) were combined and heated to to form a solution. A 2:1 mole ratio triethylborane:1,6-hexanediamine complex (1.90 grams) was added to the cooled polymer solution and then gently heated under a nitrogen atmosphere to form a homogeneous solution. The air bubbles were allowed to rise and escape. This solution is hereinafter referred to as "Initiator Component B".

Initiator Component C

A slurry containing Blendex 360 (18.05 grams) and dibutyl maleate (33.51 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. A 2:1 mole ratio triethylborane: 1,6-hexanediamine complex (1.90 grams) and a portion of this dispersion (10.00 grams) were combined and gently heated under a nitrogen atmosphere to form a homogeneous dispersion. The air bubbles were allowed to rise and escape. This dispersion is hereinafter referred to as "Initiator Component C".

Polymerizable Compositions

A slurry containing Blendex 360 (58.41 grams) and THFMA (161.59 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. This monomer blend is hereinafter referred to as "Monomer Blend B". Two Polymerizable Compositions were prepared as in Examples 1–10 and Comparative Example C1 using the components shown in Table 12.

TABLE 12

| Polymerizable Composition | Weight Monomer Blend B (grams) | Weight MAEAcAc (grams) | Weight PUMA1250 (grams) | Weight Metal Salt Solution A (grams) | Weight Z-light W1600 (grams) |
|---|---|---|---|---|---|
| A | 89.34 | 8.36 | 0 | 0.10 | 2.20 |
| B | 79.34 | 8.36 | 10.00 | 0.10 | 2.20 |

Each of Polymerizable Compositions A and B were packaged opposite each of Initiator Components B and C, as shown in Table 13 using the method described in Example 1–10 and Comparative Example C1. Test specimens were prepared and tested according to the Test Methods outlined above. The results are summarized in Tables 13–15. In Table 16 the time to 0.34 MPa HDPE OLS (T50), Worklife (WL) and the T50/WL ratio were estimated for Examples 34–37.

TABLE 13

| Example | Initiator Component | Polymerizable Composition | HDPE T-peel (N/cm) | HDPE OLS (MPa) | PP OLS (MPa) |
|---|---|---|---|---|---|
| 34 | B | A | 21 | 5.87 | 2.21 |
| 35 | B | B | SB | 5.86 | 2.36 |
| 36 | C | A | 19 | 5.84 | 2.81 |
| 37 | C | B | SB | 5.83 | 2.71 |

SB signifies that the substrate broke

TABLE 14

| Example | OLS at 10 min Open Time (MPa) | OLS at 20 min Open Time (MPa) | OLS at 30 min Open Time (MPa) | OLS at 45 min Open Time (MPa) | OLS at 60 min Open Time (MPa) |
|---|---|---|---|---|---|
| 34 | 5.76 | 5.88 | 5.82 | 5.31 | 3.86 |
| 35 | 5.85 | 5.82 | 5.85 | 3.28 | 3.71 |
| 36 | 5.81 | 5.79 | 5.81 | 5.92 | 4.54 |
| 37 | 5.75 | 5.85 | 5.61 | 4.94 | NT |

NT signifies that performance was not tested.

TABLE 15

| Example | OLS at 45 minutes cure (MPa) | OLS at 60 minutes cure (MPa) | OLS at 75 minutes cure (MPa) | OLS at 90 minutes cure (Mpa) | OLS at 105 minutes cure (MPa) |
|---|---|---|---|---|---|
| 34 | 0 | 0.01 | 0.11 | 0.39 | 1.09 |
| 35 | 0 | 0.06 | 0.14 | 0.49 | 0.74 |
| 36 | 0 | 0 | 0.08 | 0.39 | 1.13 |
| 37 | 0.01 | 0.05 | 0.19 | 0.59 | 1.79 |

TABLE 16

| Example | Worklife (minutes) | T50 (minutes) | T50/WL ratio |
|---|---|---|---|
| 34 | 30 | 88 | 3/1 |
| 35 | 30 | 88 | 3/1 |
| 36 | 45 | 88 | 2/1 |
| 37 | 30 | 81 | 2.7/1 |

Examples 38–44

Polymerizable Compositions were prepared as in Examples 1–10 and Comparative Example C1, except with various decomplexers as shown in Table 17. Each Polymerizable Composition was packaged opposite Initiator Component A, as in Example 1–10 and Comparative Example C1. Test specimens were prepared and tested according to the Test Methods outlined above. The results are shown in Tables 20–22. In Table 23 the time to 0.34 MPa HDPE OLS (T50), Worklife (WL) and the T50/WL ratio were estimated for Examples 38–44.

TABLE 17

| Example | Weight Monomer Blend A (grams) | Weight (grams) and Identity of Decomplexer | Weight Metal Salt Solution A (grams) |
|---|---|---|---|
| 38 | 43.62 | 6.33 DEGAcAc$_2$ | 0.05 |
| 39 | 40.38 | 9.57 p(Sty-AAcAc) | 0.05 |
| 40 | 42.27 | 7.68 MAEAcAc | 0.05 |
| 41 | 48.63 | 1.17 MAEMal | 0.20 |
| 42 | 48.62 | 1.18 MAESucc | 0.20 |
| 43 | 47.46 | 2.34 EtHexMal | 0.20 |
| 44 | 48.89 | 0.91 PhNHAcAc | 0.20 |

Examples 45–46

Polymerizable Compositions

A slurry containing Blendex 360 (199.50 grams), THFMA (476.25 grams), and AMSPU2400 (39.00 grams) was allowed to stand at 70° C. for 2 hours. The resultant opaque dispersion was allowed to cool and then sheared aggressively with a saw-toothed blade of a laboratory dispersator, available from Premier Mill Corporation; Reading, Pa. Z-Light W 1600 (35.25 grams) was added to the warm dispersion and mixed well. This monomer blend is hereinafter referred to as "Monomer Blend C".

Polymerizable Compositions were prepared as in Examples 1–10 and Comparative Example C1, except with a different decomplexer (TMXDI), and replacing Monomer Blend A with Monomer Blend C as shown in Table 18. Each Polymerizable Composition was packaged opposite Initiator Component A, as in Examples 1–10 and Comparative Example C1. Test specimens were prepared and tested according to the Test Methods outlined above. The results are shown in Tables 20–22. In Table 23 the time to 0.34 MPa HDPE OLS (T50), Worklife (WL) and the T50/WL ratio were estimated for Examples 45–46.

TABLE 18

| Example | Weight Monomer Blend C (grams) | Weight TMXDI (grams) | Weight Additional Dimethylacrylamide (grams) | Weight Metal Salt Solution A (grams) |
|---|---|---|---|---|
| 45 | 48.77 | 0.63 | 0.40 | 0.20 |
| 46 | 48.37 | 0.63 | 0 | 1.00 |

Example 47–58

A slurry of copper (II) bromide (5.00 grams) in dimethylacrylamide (15.00 grams) was heated to form a homogeneous black solution. This copper (II) bromide solution is hereinafter referred to as "Metal Salt Solution U".

Hexahydrophthalic anhydride (10.00 grams) was dissolved in THFMA (15.00 grams). This solution was used to prepare Examples 47–58.

Polymerizable Compositions were prepared as in Examples 1–10 and Comparative Example C1, except with a different decomplexer (hexahydrophthalic anhydride), and replacing Metal Salt Solution A with Metal Salt Solution T as shown in Table 18. Each Polymerizable Composition was packaged opposite Initiator Component A, as in Examples 1–10 and Comparative Example C1. Test specimens prepared and tested according to the Test Methods outlined above. The results are shown in Tables 20–22. In Table 23 the time to 0.34 MPa HDPE OLS (T50), Worklife (WL) and the T50/WL ratio were estimated for Examples 47–58.

TABLE 19

| Example | Weight Monomer Blend A (grams) | Weight HHPhAnh solution (grams) | Weight MAEAcAc (grams) | Weight Metal Salt Solution U (grams) |
|---|---|---|---|---|
| 47 | 48.91 | 0.99 | 0 | 0.10 |
| 48 | 48.42 | 1.48 | 0 | 0.10 |
| 49 | 48.61 | 0.99 | 0 | 0.40 |
| 50 | 47.66 | 0.99 | 1.25 | 0.10 |
| 51 | 47.17 | 1.48 | 1.25 | 0.10 |
| 52 | 49.06 | 0.69 | 0.15 | 0.10 |
| 53 | 48.89 | 0.69 | 0.32 | 0.10 |
| 54 | 48.57 | 0.69 | 0.64 | 0.10 |
| 55 | 45.88 | 0.05 | 3.97 | 0.10 |
| 56 | 46.03 | 0.10 | 3.77 | 0.10 |
| 57 | 46.35 | 0.19 | 3.36 | 0.10 |
| 58 | 46.96 | 0.39 | 2.55 | 0.10 |

TABLE 20

| Example | HDPE T-peel (N/cm) | HDPE OLS (MPa) | PP OLS (MPa) |
|---|---|---|---|
| 38 | 58 | 4.11 | 3.96 |
| 39 | 37 | 5.87 | 5.12 |
| 40 | SB | 5.86 | 3.54 |
| 41 | NT | 5.99 | 4.49 |
| 42 | NT | 3.67 | 1.45 |
| 43 | NT | 5.24 | 3.08 |
| 44 | NT | 5.61 | 0.94 |
| 45 | NT | NT | NT |
| 46 | NT | 6.68 | NT |
| 47 | SB | 6.14 | 7.81 |
| 48 | SB | 6.59 | 7.23 |
| 49 | SB | 6.56 | 7.81 |
| 50 | SB | 6.56 | 8.03 |
| 51 | SB | 6.54 | 8.08 |
| 52 | SB | 6.52 | 7.27 |
| 53 | SB | 6.48 | 7.77 |
| 54 | SB | 6.46 | 7.97 |
| 55 | SB | 6.11 | 2.65 |
| 56 | SB | 6.61 | 2.45 |
| 57 | SB | 6.63 | 3.01 |
| 58 | SB | 6.61 | 3.73 |

NT signifies that performance was not tested, SB signifies that the substrate broke

TABLE 21

| Example | OLS at 10 min Open Time (MPa) | OLS at 20 min Open Time (MPa) | OLS at 30 min Open Time (MPa) | OLS at 45 min Open Time (MPa) | OLS at 60 min Open Time (Mpa) |
|---|---|---|---|---|---|
| 38 | 4.29 | 3.83 | 3.51 | 3.10 | 1.91 |
| 39 | 5.52 | 5.58 | 5.69 | 5.59 | 5.34 |
| 40 | 5.87 | 5.92 | 5.86 | 5.54 | 2.73 |
| 41 | 5.91 | 5.43 | 2.28 | NT | NT |
| 42 | 4.30 | 4.09 | 3.74 | NT | NT |
| 43 | 4.50 | 4.39 | 4.82 | NT | NT |

TABLE 21-continued

| Example | OLS at 10 min Open Time (MPa) | OLS at 20 min Open Time (MPa) | OLS at 30 min Open Time (MPa) | OLS at 45 min Open Time (MPa) | OLS at 60 min Open Time (Mpa) |
|---|---|---|---|---|---|
| 44 | 4.77 | 4.01 | 3.38 | NT | NT |
| 45 | 6.47 | 6.71 | 4.52 | NT | NT |
| 46 | 6.50 | 5.52 | 5.30 | 5.37 | NT |
| 47 | 6.56 | 4.42 | 2.05 | NT | NT |
| 48 | 2.54 | 1.31 | 1.66 | NT | NT |
| 49 | 6.58 | 6.47 | 5.82 | NT | NT |
| 50 | 5.49 | 3.72 | 2.05 | NT | NT |
| 51 | 4.39 | 3.39 | 1.53 | NT | NT |
| 52 | 6.49 | 6.33 | 4.61 | NT | NT |
| 53 | 6.45 | 5.73 | 4.38 | NT | NT |
| 54 | 6.49 | 5.59 | 3.41 | NT | NT |
| 55 | 6.63 | 6.61 | 6.24 | 6.52 | 6.63 |
| 56 | 6.60 | 6.67 | 6.62 | 6.56 | 4.50 |
| 57 | 6.57 | 5.99 | 6.50 | 5.27 | NT |
| 58 | 5.94 | 6.28 | 2.97 | NT | NT |

NT signifies that performance was not tested.

TABLE 22

| Example | OLS at 45 min. cure (MPa) | OLS at 60 min. cure (MPa) | OLS at 75 min. cure (MPa) | OLS at 90 min. cure (MPa) | OLS at 105 min. cure (MPa) | OLS at 120 min. cure (MPa) | OLS at 135 min. cure (MPa) | OLS at 150 min. cure (MPa) | OLS at 180 min. cure (MPa) |
|---|---|---|---|---|---|---|---|---|---|
| 38 | NT | NT | NT | NT | NT | NT | NT | NT | NT |
| 39 | NT | NT | NT | NT | NT | NT | NT | NT | NT |
| 40 | 0 | 0.02 | 0.14 | 0.52 | 1.55 | NT | NT | NT | NT |
| 41 | 0.03 | 0.05 | 0.08 | 0.15 | 0.33 | 0.70 | NT | NT | NT |
| 42 | NT | NT | NT | NT | NT | 0 | NT | 0 | 0 |
| 43 | NT | NT | NT | NT | NT | 0 | NT | 0.01 | 0.02 |
| 44 | NT | NT | NT | NT | NT | NT | NT | NT | NT |
| 45 | 0.07 | 0.28 | 0.91 | NT | NT | NT | 2.43 | NT | NT |
| 46 | NT | NT | NT | NT | NT | 0.18 | NT | 0.28 | 0.30 |
| 47 | 0.08 | 0.24 | 0.59 | 0.74 | NT | NT | NT | NT | NT |
| 48 | 0.09 | 0.20 | 0.37 | 0.54 | NT | NT | NT | NT | NT |
| 49 | 0.03 | 0.06 | 0.14 | 0.13 | NT | NT | NT | NT | NT |
| 50 | 0.15 | 0.49 | 0.50 | 0.99 | NT | NT | NT | NT | NT |
| 51 | 0.12 | 0.26 | 0.38 | 0.55 | NT | NT | NT | NT | NT |
| 52 | 0.08 | 0.15 | 0.36 | 0.31 | NT | NT | NT | NT | NT |
| 53 | 0.07 | 0.17 | 0.46 | 0.54 | NT | NT | NT | NT | NT |
| 54 | 0.09 | 0.39 | 0.61 | 0.54 | NT | NT | NT | NT | NT |
| 55 | 0 | 0.01 | 0.08 | 0.26 | 1.10 | NT | NT | NT | NT |
| 56 | 0 | 0.06 | 0.25 | 1.12 | 2.58 | NT | NT | NT | NT |
| 57 | 0.04 | 0.27 | 0.85 | 2.62 | 5.94 | NT | NT | NT | NT |
| 58 | 0.24 | 1.02 | 3.31 | 5.64 | 6.45 | NT | NT | NT | NT |

NT signifies that performance was not tested.

TABLE 23

| Example | Worklife (minutes) | T50 (minutes) | T50/WL ratio |
|---|---|---|---|
| 38 | 30 | ND | ND |
| 39 | 60 | ND | ND |
| 40 | 45 | 85 | 1.9/1 |
| 41 | 10 | 106 | 10.6/1 |
| 42 | 30 | ND | ND |
| 43 | 30 | ND | ND |
| 44 | 30 | ND | ND |
| 45 | 20 | 62 | 3.1/1 |
| 46 | 45 | 200 | 4.4/1 |
| 47 | <10 | 63 | >6.3/1 |
| 48 | <10 | 75 | >7.5/1 |
| 49 | 20 | 120 | 6/1 |
| 50 | <10 | 62 | >6.2/1 |
| 51 | <10 | 73 | >7.3/1 |
| 52 | 20 | 77 | 3.9/1 |
| 53 | 10 | 70 | 7/1 |
| 54 | 10 | 61 | 6.1/1 |
| 55 | 60 | 91 | 1.5/1 |
| 56 | 45 | 76 | 1.7/1 |
| 57 | 30 | 62 | 2/1 |
| 58 | 15 | 47 | 3/1 |

ND signifies that a value was not determined

The complete disclosures of the patents, patent documents, and publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A bonding composition comprising:
   (i) an organoborane;
   (ii) at least one polymerizable monomer; and
   (iii) a metal salt according to formula (1):

$$[M^{a+}L_n][X^{-m}]_{a/m} \qquad (1)$$

wherein:
   M is a metal cation having two chemically accessible oxidation states and having positive charge a, where a is an integer ranging from 1 to 6;
   X is a counterion having charge -m, where m is an integer ranging from 1 to 3;
   L is a covalently bonded ligand; and n is an integer ranging from 0 to 10 representing the number of ligands covalently bonded to the metal cation.

2. The bonding composition of claim 1, wherein M is a cation selected from the group consisting of vanadium, chromium, manganese, iron, cobalt, nickel, copper, molybdenum, ruthenium, rhodium, palladium, antimony, platinum, and cerium.

3. The bonding composition of claim 1, wherein M is a cation selected from the group consisting of manganese, iron, cobalt, and copper.

4. The bonding composition of claim 1, wherein M is a copper or iron cation.

5. The bonding composition of claim 1, wherein the two chemically accessible oxidation states of metal cation M are separated by one unit of charge.

6. The bonding composition of claim 1, wherein X is selected from the group consisting of halides, borates sulfonates, and carboxylates.

7. The bonding composition of claim 1, wherein X is selected from the group consisting of chloride, bromide, tetrafluoroborate, trifluoromethanesulfonate, naphthenate, and 2-ethylhexanoate.

8. The bonding composition of claim 1, wherein L is selected from the group consisting of water, ammonia, amine, carbonyl, isonitriles, phosphines, phosphites, arsines, nitrosyl, ethylene and alkenes.

9. The bonding composition of claim 1, wherein the metal salt is selected from the group consisting of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (II) bromide, manganese (II) bromide, cobalt (II) bromide, nickel (II) bromide, antimony (III) bromide, and palladium (II) bromide.

10. The bonding composition of claim 1, wherein the metal salt is present in an amount greater than 0 ppm and less than about 40,000 ppm based on the bonding composition.

11. The bonding composition of claim 1, wherein the metal salt is present in the bonding composition in an amount ranging from about 60 ppm to about 20,000 ppm based on the bonding composition.

12. The bonding composition of claim 1, wherein the metal salt is present in the bonding composition in an amount ranging from about 100 ppm to about 4,000 ppm based on the bonding composition.

13. The bonding composition of claim 1, wherein the bonding composition comprises about 0.003 to about 1.5%-wt. boron in the form of an organoborane, and less than about 40,000 ppm metal salt based on the bonding composition.

14. The bonding composition of claim 1, wherein the organoborane is complexed with a complexing agent and wherein the bonding composition further includes a decomplexer.

15. The bonding composition of claim 14, wherein the complexing agent is selected from the group consisting of amines, amidines, hydroxides, alkoxides, and combinations thereof.

16. The bonding composition of claim 14, wherein the decomplexer is selected from the group consisting of acid, anhydride, aldehyde, β-ketone compound, isocyanate, acid chloride, sulfonyl chloride, and combinations thereof.

17. The bonding composition of claim 1, wherein the at least one polymerizable monomer is selected from the group consisting of (meth)acrylates, (meth)acrylamides, and mixtures thereof.

18. The bonding composition of claim 1, wherein the at least one polymerizable monomer is selected from the group consisting (meth)acrylic esters of monohydric alcohols and (meth)acrylic acid esters of polyhydric alcohols.

19. The bonding composition of claim 1 further including a reactive diluent.

20. The bonding composition of claim 1, wherein the bonding composition has a worklife as defined in the Worklife Test Method of about 5 minutes or greater.

21. The bonding composition of claim 1, wherein the bonding composition has a worklife as defined in the Worklife Test Method of about 10 minutes or greater.

22. The bonding composition of claim 1, wherein the bonding composition has a worklife as defined in the Worklife Test Method of about 20 minutes or greater.

23. A bonded composite comprising
a first substrate; and a second substrate adhesively bonded together by a layer of a cured bonding composition according to claim 1.

24. The bonded composite of claim 23, wherein at least one of the first and second substrates is a low surface energy polymeric material.

25. The bonded composite of claim 23, wherein the first and second substrates are each independently selected from low surface energy polymeric materials.

26. The bonded composite of claim 23, wherein at least one of the first and second substrates is selected from the group consisting of polyethylene, polypropylene and polytetrafluoroethylene.

27. The bonded composite of claim 26, wherein the first and second substrates are each independently selected from the group consisting of polyethylene, polypropylene and polytetrafluoroethylene.

28. A reactive, two-part bonding composition comprising:
(a) an initiator component comprising an organoborane; and
(b) a polymerizable composition comprising:
at least one polymerizable monomer; and
a metal salt according to formula (1):

$$[M^{a+}L_n][X^{-m}]_{a/m} \qquad (1)$$

wherein:
M is a metal cation having two chemically accessible oxidation states and having positive charge a, where a is an integer ranging from 1 to 6;
X is a counterion having charge −m, where m is an integer ranging from 1 to 3;
L is a covalently bonded ligand; and
n is an integer ranging from 0 to 10 representing the number of ligands covalently bonded to the metal cation.

29. The reactive two-part bonding composition of claim 28, wherein the first part and the second part are combined in a whole number ratio of about 1:10 to about 1:1.

30. The reactive two-part bonding composition of claim 28, wherein the organoborane is complexed with a complexing agent and wherein the second part further comprises a decomplexer.

31. The reactive two-part bonding composition of claim 28, wherein M is a cation selected from the group consisting of vanadium, chromium, manganese, iron, cobalt, nickel, copper, molybdenum, ruthenium, rhodium, palladium, antimony, platinum, and cerium.

32. The reactive two-part bonding composition of claim 28, wherein M is a cation selected from the group consisting of manganese, iron, cobalt, and copper.

33. The reactive two-part bonding composition of claim 28, wherein M is a copper or iron cation.

34. The reactive two-part bonding composition of claim 28, wherein the two chemically accessible oxidation states of metal cation M are separated by one unit of charge.

35. The reactive two-part bonding composition of claim 28, wherein X is selected from the group consisting of halides, borates, sulfonates, and carboxylates.

36. The reactive two-part bonding composition of claim 28, wherein X is selected from the group consisting of chloride, bromide, tetrafluoroborate, trifluoromethanesulfonate, naphthenate, and 2-ethylhexanoate.

37. The reactive two-part bonding composition of claim 28, wherein L is selected from the group consisting of water, ammonia, amine, carbonyl, isonitriles, phosphines, phosphites, arsines, nitrosyl, ethylene and alkenes.

38. The reactive two-part bonding composition of claim 28, wherein the metal salt is selected from the group consisting of copper (II) bromide, copper (II) chloride, copper (II) 2-ethylhexanoate, iron (III) bromide, vanadium (III) bromide, chromium (III) bromide, ruthenium (III) bromide, copper (II) tetrafluoroborate, copper (II) trifluoromethanesulfonate, copper (II) naphthenate, copper (I) bromide, iron (III) bromide, manganese (II) bromide, cobalt (II) bromide, nickel (II) bromide, antimony (III) bromide, and palladium (II) bromide.

39. The reactive two-part bonding composition of claim 28, wherein the metal salt is present in an amount greater than 0 ppm and less than about 40,000 ppm based on the bonding composition.

40. The reactive two-part bonding composition of claim 28, wherein the bonding composition comprises about 0.003 to about 1.5%-wt. boron in the form of an organoborane, and less than about 40,000 ppm metal salt based on the bonding composition.

41. The reactive two-part bonding composition of claim 28, wherein the at least one polymerizable monomer is selected from the group consisting of (meth)acrylates, (meth)acrylamides, and mixtures thereof.

42. The reactive two-part bonding composition of claim 28, wherein the bonding composition has a worklife as defined in the Worklife Test Method of about 5 minutes or greater.

43. The reactive two-part bonding composition of claim 28, wherein the bonding composition has a worklife as defined in the Worklife Test Method of about 10 minutes or greater.

44. The reactive two-part bonding composition of claim 28, wherein the bonding composition has a worklife as defined in the Worklife Test Method of about 20 minutes or greater.

45. A reactive, two-part bonding composition comprising:
(a) an initiator component comprising an organoborane and a metal salt according to formula (1):

$$[M^{a+}L_n][X^{-m}]_{a/m} \tag{1}$$

wherein:
M is a metal cation having two chemically accessible oxidation states and having positive charge a, where a is an integer ranging from 1 to 6;

X is a counterion having charge -m, where m is an integer ranging from 1 to 3;

L is a covalently bonded ligand; and n is an integer ranging from 0 to 10 representing the number of ligands covalently bonded to the metal cation; and (b) a polymerizable composition comprising at least one polymerizable monomer.

46. The reactive two-part bonding composition of claim 45, wherein the organoborane is complexed with a complexing agent and wherein the second part further comprises a decomplexer.

47. The reactive two-part bonding composition of claim 45, wherein M is a cation selected from the group consisting of vanadium, chromium, manganese, iron, cobalt, nickel, copper, molybdenum, ruthenium, rhodium, palladium, antimony, platinum, and cerium.

48. The reactive two-part bonding composition of claim 45, wherein M is a copper or vanadium cation.

49. The reactive two-part bonding composition of claim 45, wherein X is selected from the group consisting of halides, borates, sulfonates, and carboxylates.

50. The reactive two-part bonding composition of claim 45, wherein X is selected from the group consisting of chloride, bromide, tetrafluoroborate, trifluoromethanesulfonate, naphthenate, and 2-ethylhexanoate.

51. The reactive two-part bonding composition of claim 45 further comprising a metal salt of formula 1 in the polymerizable composition.

* * * * *

UNITED STATES PATENT AND TRADEMARK OFFICE
CERTIFICATE OF CORRECTION

PATENT NO. : 6,734,268 B1
APPLICATION NO. : 10/037058
DATED : May 11, 2004
INVENTOR(S) : Dean M. Moren It is certified that error appears in the above-identified patent and that said Letters Patent is hereby corrected as shown below:

Column 3
Line 51, delete "substrates," and insert -- substrate; --, therefor.

Column 6
Line 33, delete " $H_2NR^8(R^9O)_w—R^{10}O)_x—R^9O)_y—R^8NH_2$ " and insert
-- $H_2NR^8(R^9O)_w—(R^{10}O)_x—(R^9O)_y—R^8NH_2$ --, therefor.

Line 65, delete "polyethyleneoxidediaamine" and insert
-- polyethyleneoxidediamine --, therefor.

Column 7
Line 48, delete " $R^{17\ and\ R18}$ " and insert -- $R^{17}$ and $R^{18}$ --, therefor.

Column 11
Line 22, delete "$R^<$is" and insert -- $R^{21}$ is --, therefor.

Column 13
Line 19, after "present", delete "is".

Column 15
Line 6, delete "20 mJ/m" and insert -- 20 mJ/m$^2$ --, therefor.
Line 49, after "the" (2$^{nd}$ occurrence), delete ",".

Column 18
Line 63, delete "end point" and insert -- endpoint. --, therefor.

Column 26
Line 65, delete "demostrates" and insert -- demonstrates --, therefor.

Column 27
Line 5, delete "prepared" and insert -- used --, therefor.
Line 13, delete "to" before "form".
Line 61, delete "Example" and insert -- Examples --, therefor.

Column 29
Line 6, delete "Example" and insert -- Examples --, therefor.

Column 30
Line 7, after "specimens", insert -- were --.

UNITED STATES PATENT AND TRADEMARK OFFICE
CERTIFICATE OF CORRECTION

PATENT NO. : 6,734,268 B1
APPLICATION NO. : 10/037058
DATED : May 11, 2004
INVENTOR(S) : Dean M. Moren It is certified that error appears in the above-identified patent and that said Letters Patent is hereby corrected as shown below:

<u>Column 33</u>
Line 18, in Claim 6, after "borates", insert -- , --.

<u>Column 35</u>
Line 25, in Claim 38, delete "iron (III)" and insert -- iron (II) --, therefor.

Signed and Sealed this

Twenty-first Day of November, 2006

JON W. DUDAS
*Director of the United States Patent and Trademark Office*